(12) United States Patent
Kimura

(10) Patent No.: US 8,319,844 B2
(45) Date of Patent: *Nov. 27, 2012

(54) LENS DRIVING DEVICE, IMAGE STABILIZING UNIT, AND IMAGE PICKUP APPARATUS

(75) Inventor: Masafumi Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 315 days.

This patent is subject to a terminal disclaimer.

(21) Appl. No.: 12/775,371

(22) Filed: May 6, 2010

(65) Prior Publication Data

US 2010/0214426 A1  Aug. 26, 2010

Related U.S. Application Data

(63) Continuation of application No. 11/841,365, filed on Aug. 20, 2007, now Pat. No. 7,742,075.

(30) Foreign Application Priority Data

Aug. 30, 2006  (JP) .................................. 2006-233122

(51) Int. Cl.
*H04N 5/228* (2006.01)
*G03B 17/00* (2006.01)

(52) U.S. Cl. .................. 348/208.99; 348/208.7; 396/421

(58) Field of Classification Search ............... 348/208.7, 348/208.11, 208.99
See application file for complete search history.

(56) References Cited

U.S. PATENT DOCUMENTS

| | | | | |
|---|---|---|---|---|
| 7,710,460 B2 * | 5/2010 | Stavely | ................... | 348/208.99 |
| 7,734,083 B2 * | 6/2010 | Teramoto et al. | ............. | 382/147 |
| 7,796,878 B2 * | 9/2010 | Santo et al. | ................... | 396/133 |
| 7,982,773 B2 * | 7/2011 | Kano | ......................... | 348/208.4 |

FOREIGN PATENT DOCUMENTS

| | | | |
|---|---|---|---|
| JP | H11-211956 A | 8/1999 |
| JP | 2005-338298 A | 12/2005 |

* cited by examiner

*Primary Examiner* — Hung Lam
(74) *Attorney, Agent, or Firm* — Canon USA Inc IP Division

(57) ABSTRACT

A lens driving device having a simplified structure in which a holding member is moved relative to a stationary member with appropriate viscous damping is provided. The lens driving device includes the holding member configured to hold a compensation lens for image stabilization, the stationary member configured to support the holding member in a movable manner in a plane that is perpendicular to a light axis, a driving unit configured to change the position of the holding member relative to the stationary member, and a damping material disposed between the holding member and the stationary member. The damping material has a transition region in a frequency range between 0.3 Hz and 100 Hz.

17 Claims, 40 Drawing Sheets

FIG. 9

| TERM | VALUE | UNIT | NOTE |
|---|---|---|---|
| ω | 60 | Hz | RESONANCE FREQUENCY |
| m | 0.003 | kg | MASS OF MOVABLE PART |
| c1 | 0.2 | N/(m/s) | IN (m, c1, k1) SYSTEM, IT IS ASSUMED THAT ζ = 0.1 USING EQUATION (6) |
| k1 | 230 | N/m | DETERMINED SO THAT $(k1 + k2) = (2\pi\omega)^2 \times m$ AND ζ = 0.3 ARE SATISFIED |
| c2 | 0.52 | N/(m/s) | $= k2 \times = \tan\delta/\omega$ |
| k2 | 196.4 | N/m | DETERMINED SO THAT $(k1 + k2) = (2\pi\omega)^2 \times m$ AND ζ = 0.3 ARE SATISFIED |
| tan δ | 1.0 | | DETERMINED BY SOLID STATE PROPERTIES OF VISCOELASTIC MATERIAL |
| ζ | 0.30 | | DETERMINED USING EQUATION (8) |

LENS DRIVING DEVICE, IMAGE STABILIZING UNIT, AND IMAGE PICKUP APPARATUS

CROSS REFERENCE TO RELATED APPLICATIONS

The present application is a continuation of U.S. patent application Ser. No. 11/841,365, filed on Aug. 20, 2007, entitled "LENS DRIVING DEVICE, IMAGE STABILIZING UNIT, AND IMAGE PICKUP APPARATUS", the content of which is expressly incorporated by reference herein in its entirety. This application also claims priority from Japanese Application No. 2006-233122 filed Aug. 30, 2006, which is hereby incorporated by reference herein in their entirety.

BACKGROUND OF THE INVENTION

1. Field of the Invention

The present invention relates to a lens driving device for driving an image stabilizing lens, an image stabilizing unit including the lens driving device, and an image pickup apparatus including the image stabilizing unit.

2. Description of the Related Art

In recent years, with the advent of cameras with increased functionality, many cameras have included an image stabilizing unit that reduces image blur caused by vibration of the cameras. For example, Japanese Patent Laid-Open No. 60-143330 describes an image stabilizing unit that detects vibration, such as a camera shake, on the basis of a gyro signal so as to stabilize an image by moving a part of an optical system in a direction perpendicular to the light axis. This method has been widely used.

It is desirable that a mechanism of image stabilization provides the following two features: (a) small friction that allows excellent trackability to be provided and (b) easy design of a frequency characteristic for designers. A variety of mechanisms have already provided these features.

For example, Japanese Patent Laid-Open No. 8-184870 describes a mechanism including a lens driving device and a resilient unit and a viscous unit that restrict the displacement of a movable part. Such a structure can provide a mechanism that enables control known as "open control" and an improvement of a frequency characteristic.

In addition, Japanese Patent Laid-Open No. 2001-290184 describes a mechanism that includes a plurality of balls sandwiched by a support member that supports a compensation lens and a stationary member, and the support member is urged by a resilient member. Such a structure can drive the support member using rolling friction, and therefore, can reduce a frictional force. Additionally, since a resonance frequency is determined by a ratio of the weight of the compensation lens and the support member to the elastic coefficient of the resilient member, a desired resonance frequency can be easily obtained. As a result, excellent controllability can be obtained so that the mechanism can appropriately respond to even a small vibration.

In addition, Japanese Patent Laid-Open No. 2-232824 describes a mechanism in which a damping unit is attached to an actuator used for an optical disc pickup. This mechanism is characterized in that appropriate portions of the mechanism are filled with a gel damping material serving as a damping unit. As a result, the improved frequency characteristic of an apparatus can be provided with improved workability.

According to the technology described in Japanese Patent Laid-Open No. 8-184870, a viscous resistance can be obtained using a mechanical or electrical method. However, to obtain a viscous resistance through a mechanical method, the structure is disadvantageously complicated and a frictional force is disadvantageously increased. In contrast, to obtain a viscous resistance through an electrical method, the mechanism disadvantageously has a negative impact from an assembly-to-assembly variation in an object to be controlled. In addition, the control system disadvantageously becomes complicated.

According to the technology described in Japanese Patent Laid-Open No. 2001-290184, a compensation lens can be driven with a very small frictional force and can respond to a small camera shake. However, since this mechanism cannot provide an appropriate viscous resistance, the mechanism is greatly affected by a primary resonance and a sub-resonance, that is, the mechanism is easily affected by disturbance.

According to the technology described in Japanese Patent Laid-Open No. 2-232824, the mechanism can easily obtain an appropriate viscous resistance. However, the structure is not always suitable for image stabilizing units.

Therefore, it would be desirable to provide a lens driving device, an image stabilizing unit, and an image pickup apparatus having a simplified structure in which the location of a support member can be changed relative to a stationary member with an appropriate viscous damping.

SUMMARY OF THE INVENTION

Accordingly, the present invention provides a lens driving device, an image stabilizing unit, and an image pickup apparatus having a simplified structure in which the location of a support member can be changed relative to a stationary member with an appropriate viscous damping.

According to an embodiment of the present embodiment, a lens driving device includes a holding member configured to hold a compensation lens for image stabilization, a stationary member configured to support the holding member in a movable manner in a plane that is perpendicular to a light axis, a driving unit configured to change the position of the holding member relative to the stationary member, and a damping material disposed between the holding member and the stationary member. The damping material has a transition region in a frequency range between 0.3 Hz and 100 Hz.

Further features and aspects of the present invention will become apparent from the following description of exemplary embodiments with reference to the attached drawings.

BRIEF DESCRIPTION OF THE DRAWINGS

FIG. 4A is a front view of the lens driving device; while

FIG. 6A is a front view of a mounting portion of a damping unit included in the lens driving device according to the first exemplary embodiment of the present invention; while

FIG. 9 illustrates example values of various characteristics according to the first exemplary embodiment of the present invention.

FIG. 19A is a front view of the lens driving device according to the second exemplary embodiment of the present invention; while

FIG. 30A is a front view of the lens driving device according to the third exemplary embodiment of the present invention; while

FIG. 32A is a front view of the lens driving device according to the third exemplary embodiment of the present invention; while

FIG. 34A is a front view of the lens driving device according to the fourth exemplary embodiment of the present invention; while

FIG. 37A is a front view of the lens driving device according to the fourth exemplary embodiment of the present invention; while

DESCRIPTION OF THE EMBODIMENTS

Exemplary embodiments, features and aspects of the present invention are described in detail below with reference to the accompanying drawings.

First Exemplary Embodiment

Figure 1:
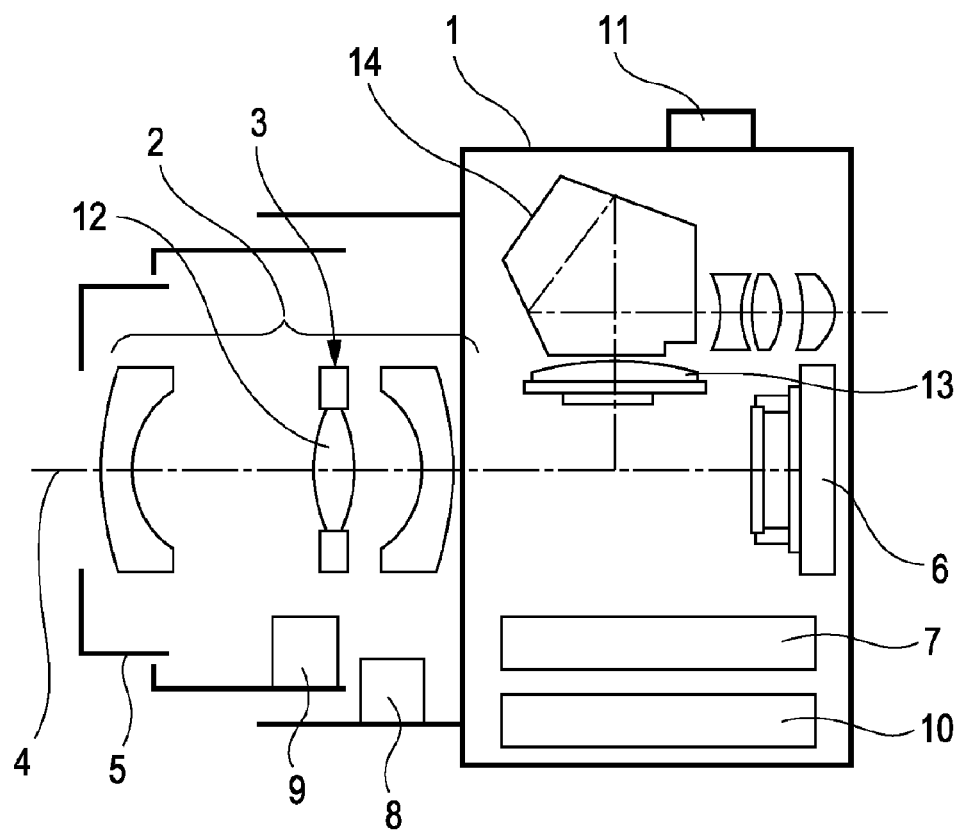
FIG. 1 illustrates an example structure of an image pickup apparatus according to various exemplary embodiments of the present invention.

An image pickup apparatus according to a first exemplary embodiment of the present invention is described below with reference to FIGS. 1 to 16. FIG. 1 illustrates an exemplary structure of the image pickup apparatus. In FIG. 1, an image pickup apparatus 1, an objective taking lens 2, and a lens driving device 3 that drives a compensation lens 12 are shown. In addition, the objective taking lens 2 having a light axis 4, a lens barrel 5, an image pickup element 6, a memory 7, a vibration sensor 8 that detects a vibration, such as a camera shake, and a focus lens driving circuit 9 that drives a focus lens (not shown) incorporated in the objective taking lens 2 are shown. A power supply 10, a release button 11, the compensation lens 12, a quick-return mirror 13, and a finder optical system 14 are also shown. The lens driving device 3 and the vibration sensor 8 form an image stabilizing unit.

The image pickup apparatus 1 forms an image on the image pickup element 6 or in the vicinity of the image pickup element 6 using the objective taking lens 2 and a focus control unit (not shown). In addition, the image pickup apparatus 1 acquires information about an object using the image pickup element 6 and stores that information in the memory 7 in synchronization with a user's operation of the release button 11.

Image stabilization using the compensation lens 12 driven by the lens driving device 3 is described next. The lens driving device 3 can appropriately drive the compensation lens 12. If camera shake occurs during exposure, a driving signal for stabilizing the image is generated on the basis of a signal output from the vibration sensor 8. This driving signal causes the lens driving device 3 to move the compensation lens 12 so that vibration of the image on the image pickup element 6 is reduced. Thus, reduction in the quality of the image due to camera shake can be compensated for.

Figure 2:
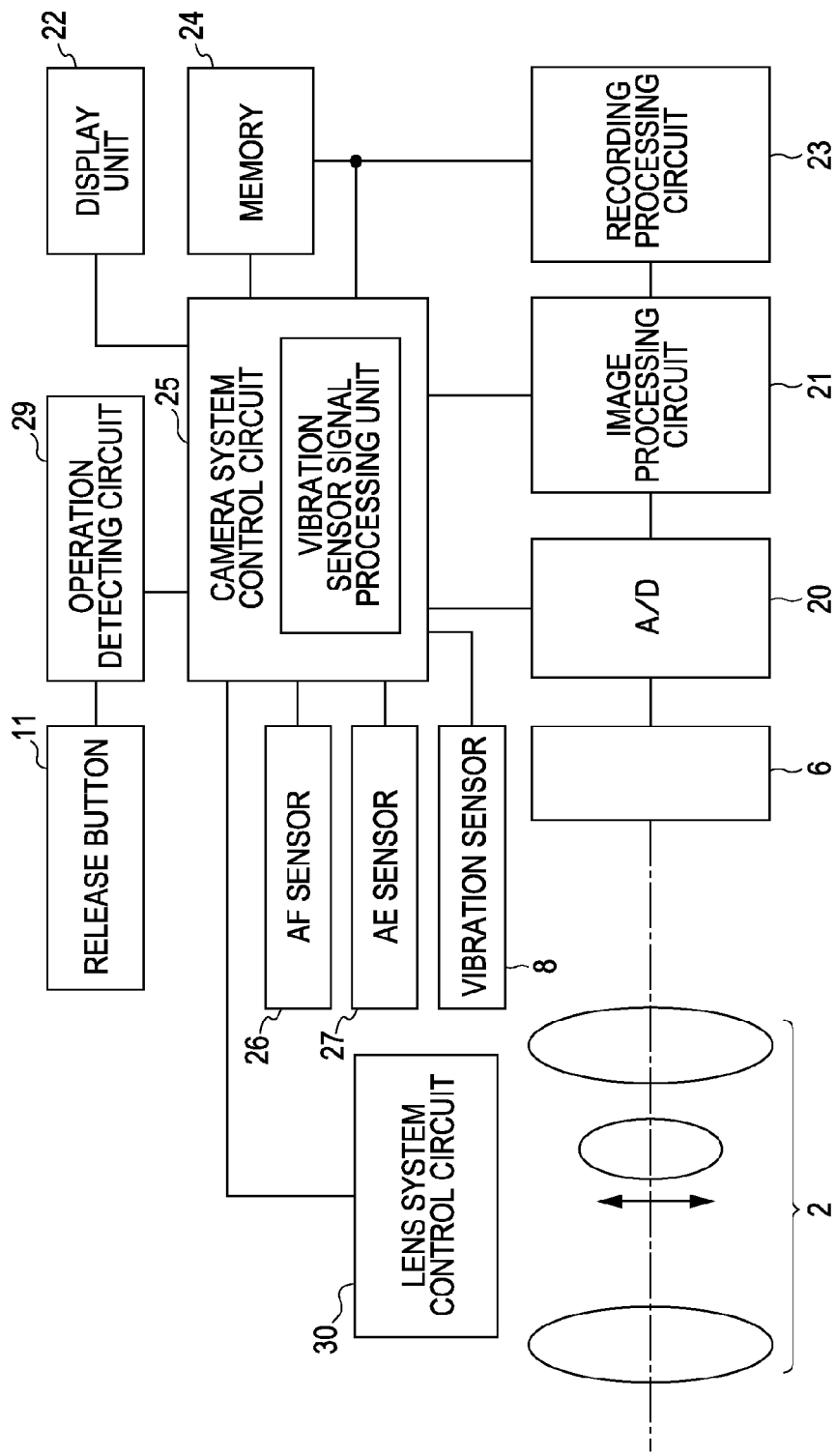
FIG. 2 is a block diagram illustrating an exemplary electrical configuration of the image pickup apparatus shown in FIG. 1.

FIG. 2 is a block diagram illustrating an exemplary electrical configuration of the image pickup apparatus 1. The image pickup apparatus 1 includes an image pickup system, an image processing system, a recording and playback system, and a control system. The image pickup system includes the objective taking lens 2 and the image pickup element 6. The image processing system includes an analog-to-digital (A/D) converter 20 and an image processing circuit 21. The recording and playback system includes a recording processing circuit 23 and a memory 24. The control system includes a camera system control circuit 25, an AF sensor 26, an AE sensor 27, the vibration sensor 8, an operation detecting circuit 29, and a lens system control circuit 30. Also, the apparatus 1 includes a display unit 22 in communication with the camera system control circuit 25.

The image pickup system is an optical processing system that focuses light output from an object on an imaging surface of the image pickup element 6 so as to form an image on the imaging surface through the objective taking lens 2. The image pickup system allows the image pickup element 6 to be exposed with an object light beam having an appropriate light intensity using an aperture (not shown) on the basis of a signal output from the AE sensor 27. The image processing circuit 21 included in the image processing system processes image signals corresponding to the number of pixels, the signals being received from the image pickup element 6 via the A/D converter 20. The image processing circuit 21 includes a white balance circuit, a gamma correction circuit, and an interpolation computing circuit. The interpolation computing circuit increases the resolution of the image through interpolation computation. The recording processing circuit 23 included in the recording and playback system outputs an image signal to the memory 24. In addition, the recording processing circuit 23 generates and stores an image output to a display unit 22. Furthermore, the recording processing circuit 23 compresses a still image or a moving image using a predetermined compression method.

The control system controls components of the image pickup apparatus in response to a detection signal output from the operation detecting circuit 29 that detects operations of the switches of the image pickup apparatus, such as the release button 11. The camera system control circuit 25 included in the control system generates timing signals during capturing an image and outputs the generated timing signals. The AF sensor 26 detects a focusing state of the image pickup apparatus 1. The AE sensor 27 detects the luminance of the object. The vibration sensor 8 detects vibration, such as a camera shake. The lens system control circuit 30 controls the focus lens driving circuit 9 and the lens driving device 3 in accordance with the signal output from the camera system control circuit 25.

The control system controls the image pickup system, the image processing system, and the recording and playback system in response to an external operation. For example, the control system detects that the release button 11 is pressed and controls the drive of the image pickup element 6, the operation of the image processing circuit 21, and the compression process performed by the recording processing circuit 23. In addition, the control system controls each of segments of an information display unit, which displays various information on the optical finder and the liquid crystal monitor using the display unit 22.

The AF sensor 26 and the AE sensor 27 are connected to the camera system control circuit 25. The camera system control circuit 25 appropriately controls the focus lens and an aperture via the lens system control circuit 30 on the basis of the signals from the AF sensor 26 and the AE sensor 27. In addition, the vibration sensor 8 is connected to the camera system control circuit 25. In a mode in which image stabilization is performed, the camera system control circuit 25 drives the lens driving device 3 on the basis of a signal output from the vibration sensor 8.

An image stabilizing process performed by changing an image scan area is described next. According to the present exemplary embodiment, the scan area of the A/D converter 20 can be changed in accordance with a signal output from the camera system control circuit 25. If camera shake occurs during exposure, the scan area is appropriately changed in accordance with a signal output from the vibration sensor 8. In this way, even when an object image is displaced on the image pickup element 6, a substantially stationary object image can be obtained. Consequently, the vibration of an image delivered to the image processing circuit 21 can be reduced, and therefore, the degradation in the quality of the image can be reduced.

If image stabilization performed by changing the image scan area and image stabilization performed by driving the compensation lens 12 are implemented and the two types of image stabilization operation work at the same time, excess image stabilization is provided. Thus, an image has blurring in a direction opposite to a direction of input vibration. According to the technology described in Japanese Patent Laid-Open No. 2-232824, image stabilizing units to be driven are switched in accordance with the characteristic of an input signal so that an appropriate operation is obtained. According to the first exemplary embodiment, the image stabilizing operation performed by moving the compensation lens 12 sufficiently works and, concurrently, the simple image stabilization operation performed by changing the image scan area appropriately works.

The lens driving device 3, which is part of the first exemplary embodiment, is described next with reference to FIGS. 3 to 16.

Figure 3:
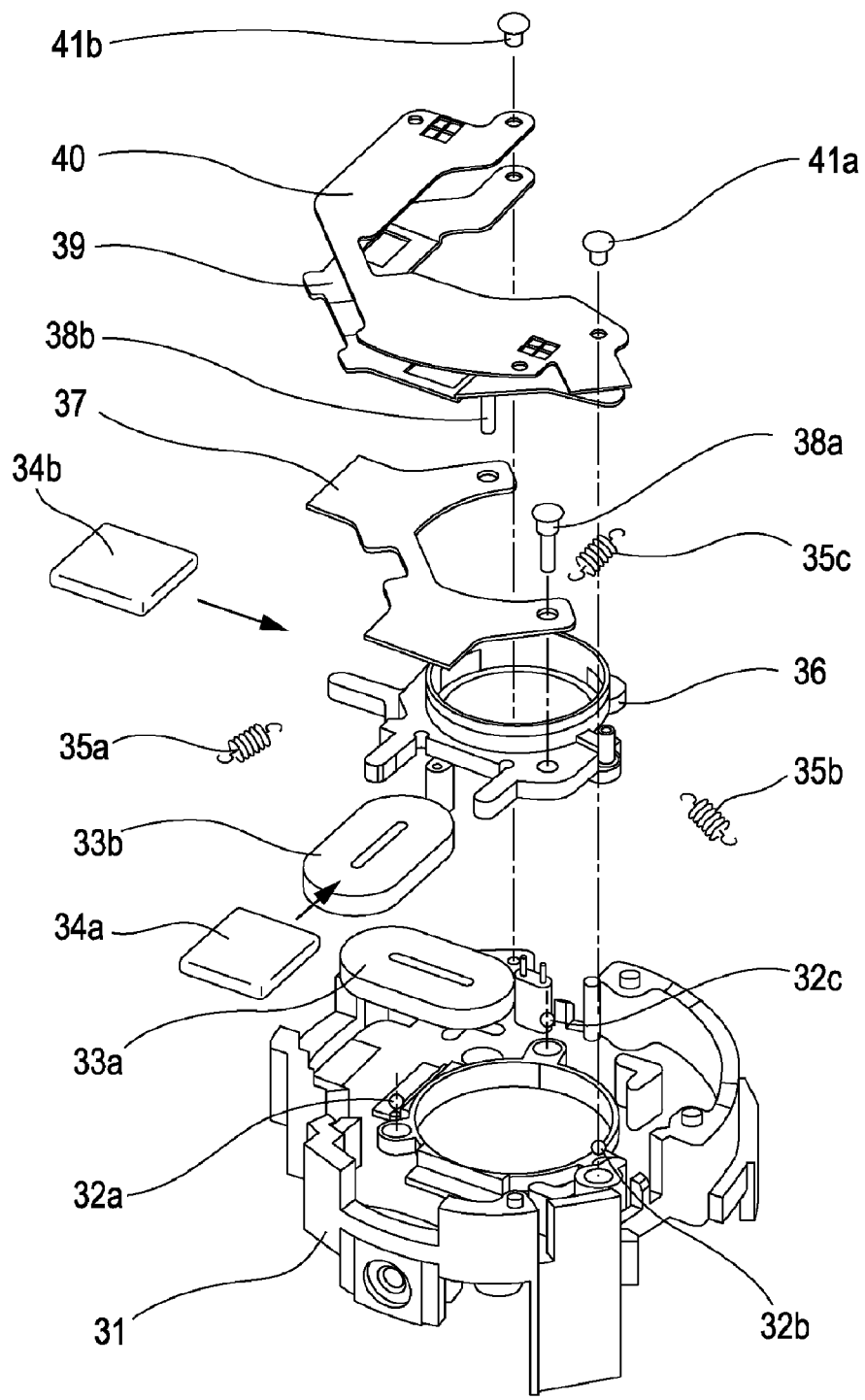
FIG. 3 is an exploded perspective view of a lens driving device according to a first exemplary embodiment of the present invention.

FIG. 3 is an exploded perspective view of the lens driving device 3 according to the present exemplary embodiment. As shown in FIG. 3, the lens driving device 3 includes a base plate 31, a movable lens barrel 36, and ball bearings 32a, 32b, and 32c sandwiched by the base plate 31 and the movable lens barrel 36. The lens driving device 3 further includes coils 33a and 33b, magnets 34a and 34b, elastic members 35a, 35b, and 35c, a magnet attraction plate 37, magnet attraction plate fixing screws 38a and 38b, a movable lens barrel support plate 39, a flexible printed circuit board (FPC) 40, and FPC fixing screws 41a and 41b.

As can be seen from FIG. 3, the lens driving device 3 according to the first exemplary embodiment can be expanded to one side of the base plate 31. Thus, assembly of the lens driving device 3 is facilitated. As a result, the productivity can be increased and the cost can be decreased.

Figure 4A:
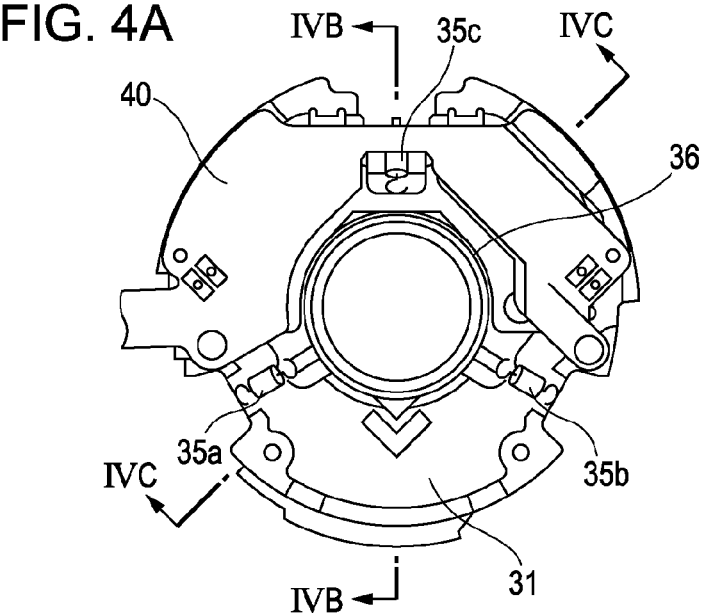
Figure 4B:
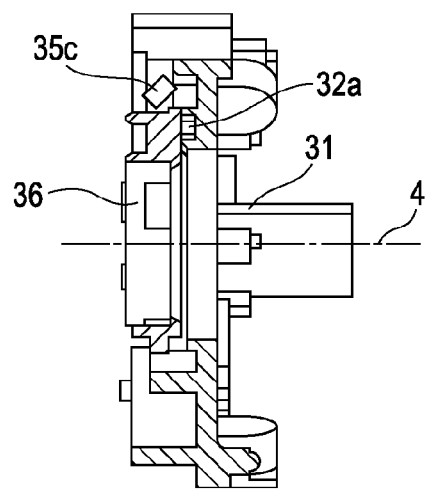
FIGS. 4B and 4C are cross-sectional views of the lens driving device shown in FIG. 4A.
Figure 4C:
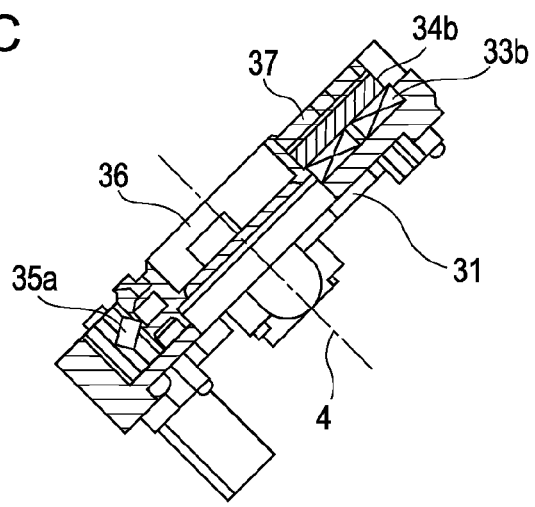

FIGS. 4A to 4C illustrate the lens driving device 3 in detail. More specifically, FIG. 4A is a front view of the lens driving device 3 when viewed in the light axis direction. FIG. 4B is a cross-sectional view taken along line IVB-IVB of FIG. 4A. FIG. 4C is a cross-sectional view taken along line IVC-IVC of FIG. 4A.

As shown in FIG. 4A, the movable lens barrel 36 is elastically supported by the elastic members 35a, 35b, and 35c on the base plate 31. According to the first exemplary embodiment, the elastic members 35a, 35b, and 35c radially extend from the light axis. The elastic members 35a, 35b, and 35c are spaced circumferentially at 120° intervals. This symmetric arrangement can prevent unwanted resonance excitation caused by an occurrence of moment. In addition, as shown in FIG. 4C, the elastic members 35a, 35b, and 35c are tilted in the light axis direction at an appropriate angle and grasp the ball bearings 32a, 32b, and 32c disposed between the base plate 31 and the movable lens barrel 36. A method for determining the elastic coefficients of the elastic members 35a, 35b, and 35c is described later.

A relative movement between the base plate 31 and the movable lens barrel 36 is described next with reference to FIGS. 3 and 4B. The ball bearings 32a, 32b, and 32c are sandwiched by the base plate 31 and the movable lens barrel 36 so that the base plate 31 moves relative to the movable lens barrel 36 via the ball bearings 32a, 32b, and 32c. Accordingly, the relative movement between the base plate 31 and the movable lens barrel 36 is affected only by a rolling friction. Since the friction is small, the movement can be appropriately achieved in respond to a very small input. In addition, by manufacturing proper precision surfaces guided by the ball bearings 32a, 32b, and 32c, an inclination of the movable lens barrel 36 and an unwanted movement of the movable lens barrel 36 in the light axis direction do not occur.

Figure 5A:
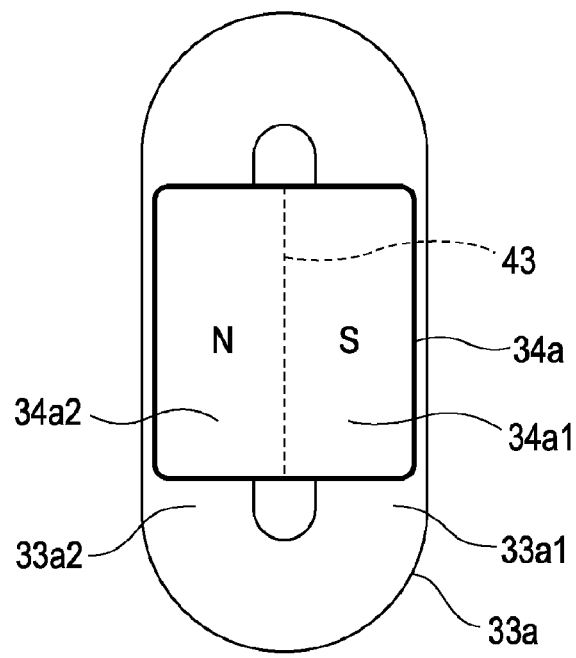
FIGS. 5A and 5B are a plane view and a side view of an actuator included in the lens driving device according to the first exemplary embodiment of the present invention, respectively.
Figure 5B:
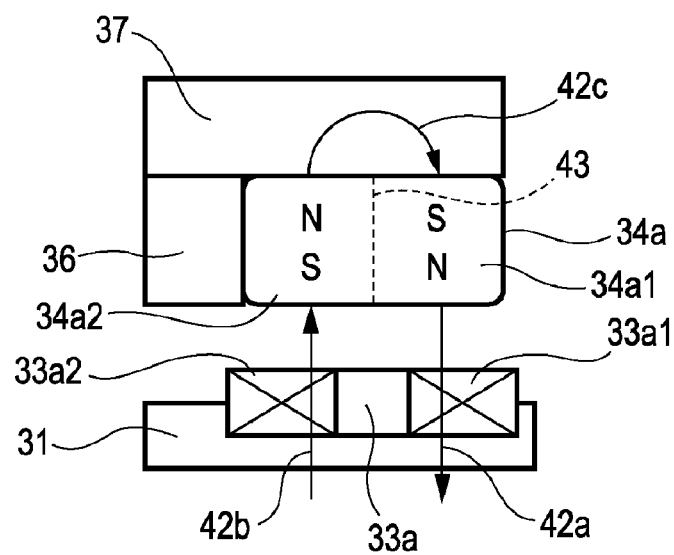

An actuator included in the lens driving device 3 is described next with reference to FIGS. 4C and 5A-B. As shown in FIG. 4C, the base plate 31 has the coils 33a and 33b secured thereon whereas the movable lens barrel 36 has the magnets 34a and 34b secured thereon. Thus, a moving magnet actuator is formed. FIGS. 5A and 5B are schematic illustrations of the actuator. FIG. 5A is a diagram of only the magnet 34a and the coil 33a viewed in the light axis direction. FIG. 5B is a cross-sectional view of the magnet 34a cut at substantially the center of the magnet 34a. The positional relationship between the magnet 34b and the coil 33b is similar to that between the magnet 34a and the coil 33a.

In FIGS. 5A and 5B, a magnetized boundary 43 between the N and S poles is shown. In FIG. 5B, magnetic field lines 42a, 42b, and 42c schematically represent typical magnetic lines generated in the vicinities of the magnet 34a and the coil 33a. As shown in FIGS. 5A and 5B, the magnet 34a has two areas 34a1 and 34a2 with the magnetized boundary 43 therebetween. The two areas 34a1 and 34a2 are differently magnetized. The magnetized boundary 43 is oriented in a direction perpendicular to a direction of a force generated by the actuator. In FIG. 5A, the magnetized boundary 43 extends in an up-down direction, and the magnet 34a and the movable lens barrel 36 are moved in a left-right direction. The coil 33a has an oval shape when viewed in the light axis direction. Two long portions 33a1 and 33a2 of the coil 33a face the areas 34a1 and 34a2 of the magnet 34a, respectively.

As shown in FIG. 5B, the magnet attraction plate 37 is disposed on a surface of the magnet 34a opposite the coil 33a. It is desirable that the magnet attraction plate 37 is formed from a soft magnetic material. The magnet attraction plate 37 allows the majority of magnetic fluxes to pass therethrough so as to decrease the permeance (the likelihood of leakage) of a magnetic circuit. As a result, the magnetic field lines 42a and 42b emanating from the magnet 34a to the coil 33a are linearly generated. According to the first exemplary embodiment, the magnet attraction plate 37 is secured to the movable lens barrel 36. Accordingly, as the thickness of the magnet attraction plate 37 increases, the weight of the movable part increases. Therefore, it is desirable that the magnet attraction plate 37 is located in the vicinity of saturated magnetic fluxes by considering the external shape of the magnet attraction plate 37, the saturation magnetic flux density, the shape of the magnet, and the surface magnetic flux density. In such a state, when the coil 33a is energized, electric currents flow in the long portions 33a1 and 33a2 in mutually opposite directions that are perpendicular to the plane of FIG. 5B. Accordingly, a driving force given by the Fleming's left-hand rule is generated. As described in FIG. 4A, since the movable lens barrel 36 is elastically supported, a relative movement between the base plate 31 and the movable lens barrel 36 is caused until the base plate 31 and the movable lens barrel 36 are moved to positions at which a resultant force of the elastic members 35a, 35b, and 35c matches the above-described driving force.

Figure 6A:
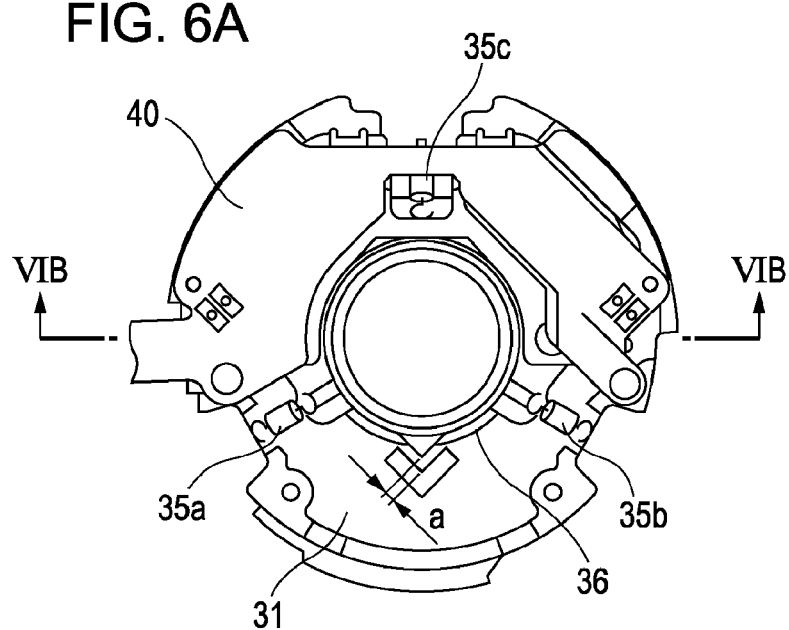
Figure 6B:
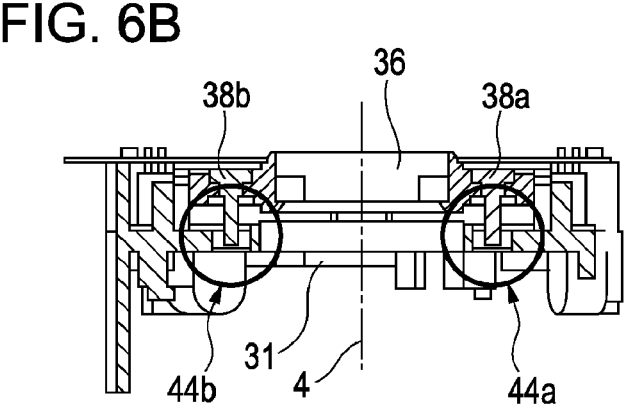
FIGS. 6B and 6C are cross-sectional views of the mounting portion of the damping unit shown in FIG. 6A.
Figure 6C:
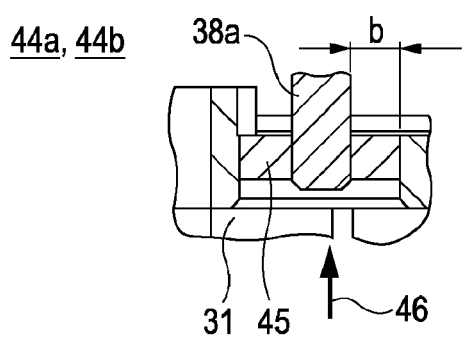

An exemplary method for mounting the damping unit providing a small friction and an optimum viscous resistance that allow acquisition of a frequency characteristic suitable for image stabilization is described next with reference to FIGS. 6A to 6C. FIG. 6A is a front view of the lens driving device 3 when viewed in the light axis direction. FIG. 6B is a cross-sectional view taken along line VIB-VIB of FIG. 6A. FIG. 6C is a detailed diagram of the mounting portion of the damping unit surrounded by a circle in FIG. 6B.

As shown in FIGS. 6A to 6C, the lens driving device 3 includes the damping unit 45. The lens driving device 3 further includes mounting portions 44a and 44b of a damping unit 45. An arrow 46 indicates a direction in which an ultraviolet light beam is emitted. As shown in FIG. 6B, the magnet attraction plate fixing screws 38a and 38b are connected to the movable lens barrel 36 and extend towards holes formed in the base plate 31 so as to overlap at least the base plate 31 in the light axis direction. It is desirable that the mounting portions 44a and 44b are disposed at symmetric locations with respect to the light axis and a plurality of the mounting portions 44a and 44b are disposed. According to the first exemplary embodiment, as shown in FIG. 6B, the mounting portions 44a and 44b are disposed at symmetric locations with respect to a light axis 4. The symmetric arrangement of the mounting portions 44a and 44b with respect to the light axis 4 eliminates an occurrence of moment acting on the movable lens barrel 36 due to a force exerted by the damping unit 45 when a relative movement between the base plate 31 and the movable lens barrel 36 occurs.

FIG. 6C is a detailed diagram of the mounting portion 44a. The mounting portion 44a is disposed so that a columnar shaft 38a secured to the movable lens barrel 36 is substantially coaxial with a cylindrical hole formed in the base plate 31. The damping unit 45 is toroidal and is disposed in a gap formed by the shaft 38a and the inner surface of the hole. The damping unit 45 can be formed from one of a variety of viscoelastic materials. According to the first exemplary embodiment, the damping unit 45 is formed from a UV-curable silicon gel having excellent assemblability and resistance to environment. An opening is formed on one side of the unit. Accordingly, after uncured gel is applied to the mounting portion 44a, an ultraviolet light beam is emitted in a direction indicated by arrow 46 so as to cure the gel. A desired characteristic of the viscoelastic material used for the damping unit 45 is described later.

As shown in FIGS. 6A to 6C, let a denote a distance between a protrusion formed on the base plate 31 and a protrusion serving as a mechanical overrun prevention unit formed on the movable lens barrel 36, and "b" denotes a distance between the movable lens barrel 36 located at a position at which the damping unit 45 is provided and the base plate 31 serving as a fixed lens barrel, as shown in FIG. 6C. It is desirable that the damping unit 45 is not significantly deformed and is used in a range in which no permanent deformations take place (i.e., a range in which the elastic coefficient linearly changes). Therefore, the following condition is satisfied:

$$a < b \quad (1)$$

To avoid the occurrence of permanent deformation, it is desirable that the following condition is satisfied:

$$a < 0.5b \quad (2)$$

Figure 7:
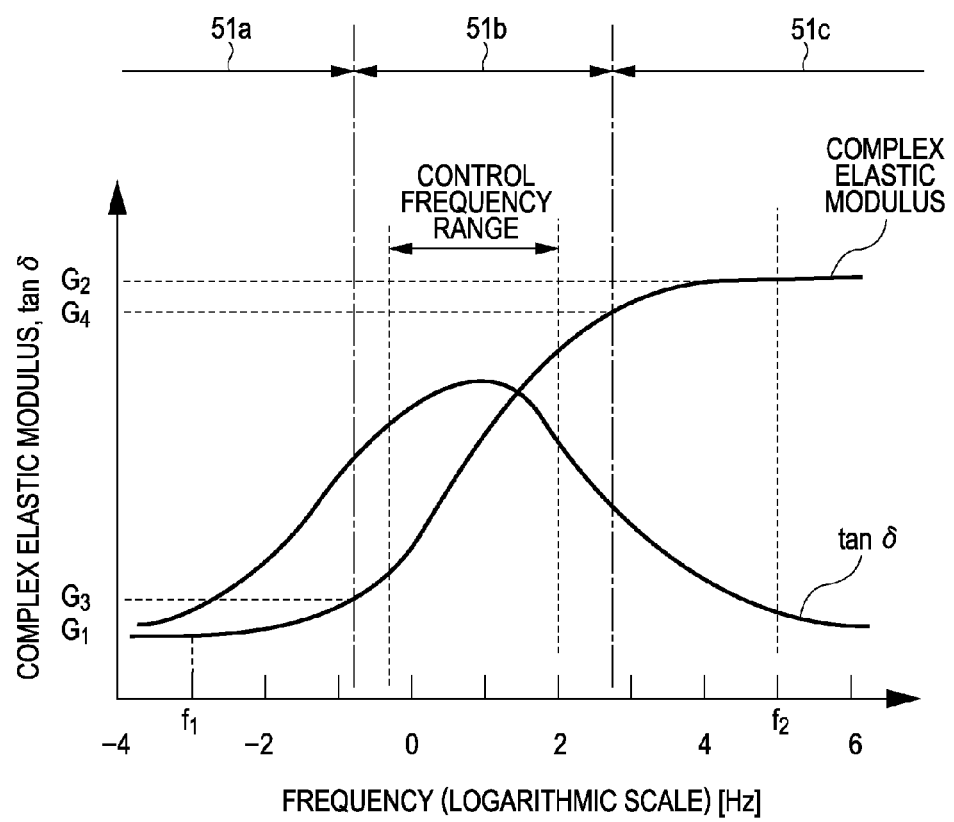
FIG. 7 is a frequency characteristic diagram of a viscoelastic material according to the first exemplary embodiment of the present invention.

A desired characteristic of the viscoelastic material used for the damping unit 45 is described next with reference to FIG. 7. In general, as shown in FIG. 7, the characteristic of a viscoelastic material changes in accordance with an input frequency. As is well known, a viscoelastic material has solid state properties for an increase in frequency similar to those for a decrease in temperature. That is, as shown in FIG. 7, a viscoelastic material has solid state properties of rubber in a frequency region (hereinafter referred to as a "rubber region") 51a lower than a transition region 51b and has solid state properties of glass in a frequency region (hereinafter referred to as a "glass region") 51c higher than the transition region 51b. In the rubber region, a viscoelastic material is soft. However, in the glass region, the viscoelastic material has Young's modulus 100 to 1000 times that in the rubber region.

The transition region 51b is described next. In FIG. 7, f1 and f2 represent a frequency that is sufficiently lower than an image stabilization control frequency and a frequency that is sufficiently higher than the image stabilization control frequency, respectively. Let a range of about 1 sec to about 1/4000 sec be a practical shutter speed when an image is captured by the image pickup apparatus held by hand and a range of about 10 to about 400 mm (35 mm photography equivalent) be a practical focal length. Then, in general, the control frequency is set to a value in a range between about 0.3 Hz to about 100 Hz. In the present exemplary embodiment, the frequency f1 that is sufficiently lower than the control frequency is set to 0.001 Hz and the frequency f2 that is sufficiently higher than the control frequency is set to 100000 Hz. Values G1 and G2 represent the complex elastic modulus at the frequency f1 and the complex elastic modulus at the frequency f2, respectively. Here, values G3 and G4 are defined using the values G1 and G2 as follows:

$$G3 = G1 + 0.1(G2 - G1) \quad (3)$$

$$G4 = G1 + 0.9(G2 - G1) \quad (4)$$

That is, the values G3 and G4 represent points having a 10% change from either end of the change width of the complex elastic modulus, respectively. According to the present exemplary embodiment, a region between the values G3 and G4 is defined as the transition region 51b.

In general, tan δ, which represents the ratio of the real part to the imaginary part of the complex elastic modulus, is increased in the transition region 51b located between the rubber region and the glass region. Tan δ represents the hysteresis of a stress-distortion diagram of a viscoelastic material. As tan δ increases, the efficiency with which the kinetic energy is transformed to the thermal energy increases. Accordingly, as noted above, a material having the transition region that includes the control frequency region between 0.3 Hz and 100 Hz and having tan δ of a large value is desirable. In recent years, many materials that satisfy the above-described conditions have been developed. A variety of products including a widely used butyl rubber have been available.

Figure 8A:
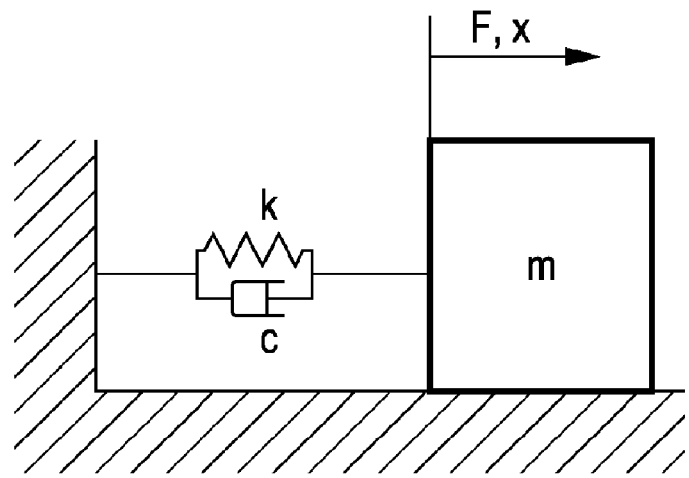
FIGS. 8A and 8B illustrate an analysis model of the lens driving device according to the first exemplary embodiment of the present invention.
Figure 8B:
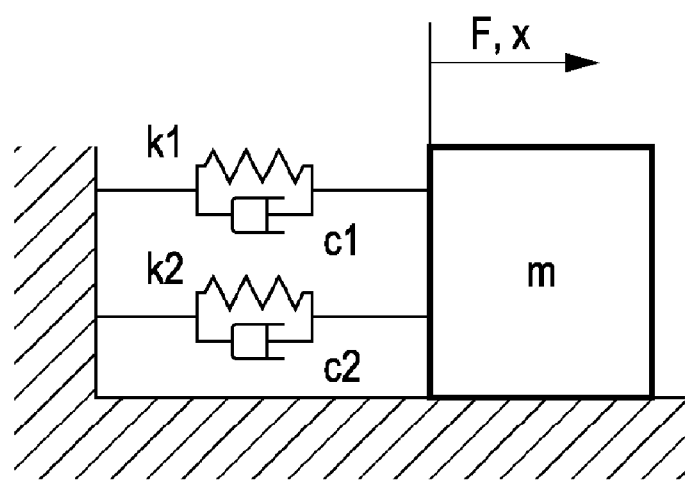

The design of a driving system is described next with reference to FIGS. 8A and 8B. FIGS. 8A and 8B are diagrams of a model of a movement of the driving system according to the first exemplary embodiment. FIG. 8A illustrates a model for the case when the damping unit is not present whereas FIG. 8B illustrates a model for the case when the damping unit is present.

According to the first exemplary embodiment, the lens driving device 3 includes the three elastic members 35a, 35b, and 35c. When considering a specific moving direction, the resultant force of the plurality of elastic members can be considered to be an imaginary spring and an imaginary dash pod. As shown in FIG. 8A, the resultant force can be represented by a one-degree-of-freedom spring-mass system. A displacement x associated with a given force F is expressed as follows:

$$F = m(d2x/dt2) + c(dx/dt) + kx \quad (5)$$

At that time, as described in FIGS. 4A to 4C, the lens driving device 3 is subjected to only a small friction. Accordingly, in general, the viscous resistance is small, and therefore, the value c is small. As a result, this design generates strong resonance. That is, although this design can appropriately respond to an input having a small amplitude, this design is easily affected by disturbance. Here, a damping ratio ξ is defined as follows:

$$\xi = c/(2\sqrt{(mk)}) \quad (6)$$

The state at the resonance peak and the transient response of the spring-mass system can be obtained by using the damping ratio ξ. If the damping ratio ξ is about 0.3 at about the resonance frequency, the excellent controllability can be obtained. However, a widely used mechanism having only a coil spring and having no damping units provides a damping ratio ξ of only about 0.1. Accordingly, since a mechanism having no damping units is easily affected by a resonance, the mechanism can not always provide high controllability.

FIG. 8B illustrates a mechanism having a damping unit. That is, like the elastic members 35a, 35b, and 35c, FIG. 8B illustrates a model in which the resultant force of a plurality of elastic members of the damping unit 45 is considered to be an imaginary spring and a dash pod. In FIGS. 8B, k1 and c1 indicate a spring and a dash pod representing elastic members, respectively, and k2 and c2 indicate a spring and a dash pod representing the damping unit, respectively. A relationship between a displacement x and a given force F is expressed as follows:

$$F = m(d2x/dt2) + (c1 + c2)(dx/dt) + (k1 + k2)x \quad (7)$$

When a suitable damping unit 45, as described in FIG. 7, is used, the value of tan δ is relatively large in the control range. If an appropriate material is used, tan δ of about 1.0 can be obtained. In this way, tan δ of a large value can be obtained. Accordingly, even when k2 is small, a sufficient damping effect can be obtained. That is, appropriate damping can be provided without decreasing the sensitivity of the actuator. At that time, the damping ratio ξ is given by the following equation:

$$\xi = (c1+c2)/(2\sqrt{(m(k1+k2))}) \quad (8)$$

Figure 10:
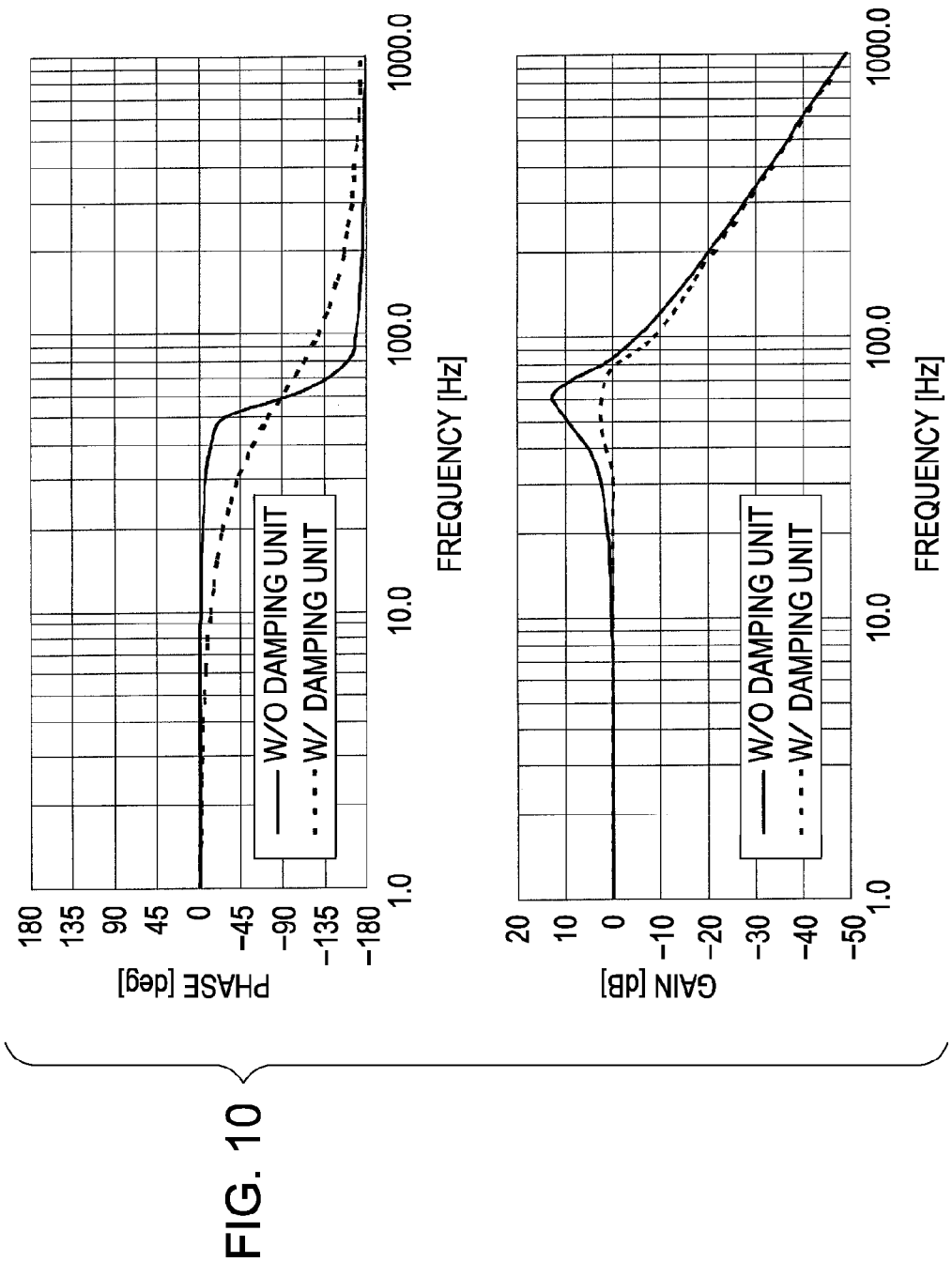
FIG. 10 is a frequency-response diagram of the analysis model of the lens driving device according to the first exemplary embodiment of the present invention.

Frequency-response diagrams obtained through computation for the cases where the damping unit 45 is present and the damping unit 45 is not present under the condition illustrated in FIG. 9 are shown in FIG. 10.

FIG. 9 illustrates conditions for a mechanism suitable for a control frequency having an upper limit of about 30 Hz. In this model, the mass of a movable part is set to 3 g. In addition, it is desirable that the resonance frequency is higher than the control frequency. In this model, the resonance frequency is set to 60 Hz. Furthermore, to increase the control frequency in a so-called open control, it is desirable that the resonance frequency is further increased. As shown in FIG. 9, the elastic coefficient k1 of the resilient member and the elastic coefficient k2 of the damping unit are determined while considering the mass of the movable part, the control frequency, and a damping ratio of the whole mechanism. In FIG. 9, the unit is designed so that the damping ratio of the whole mechanism is 0.3. In general, as the elastic coefficient k2 of the damping unit is increased, the damping ratio of the whole mechanism increases. However, as the elastic coefficient of the elastic member is decreased, a variation due to the weight of the mechanism and disturbance increases. Therefore, the design is made while considering these design points.

As can be seen from FIG. 10, when the damping unit is not present, a resonance peak noticeably appears. Therefore, the mechanism is easily affected by disturbance. In contrast, when the damping unit is present, the resonance is sufficiently prevented, and therefore, the mechanism is scarcely affected by disturbance. In addition, when the damping unit is present, the damping ratio is about 0.3, which is an appropriate value. As shown in FIG. 9, when the damping ratio is about 0.3, a rise in a gain caused by the resonance is small and the delay of the phase is relatively small. In addition, to improve the controllability, the ratio of the elastic coefficient of the damping unit to that of the elastic member can be determined so that the damping ratio is about 0.3. Furthermore, by changing the complex elastic modulus and the shape of the damping unit, the elastic coefficient of the damping unit can be set to a desired value.

Figure 11:
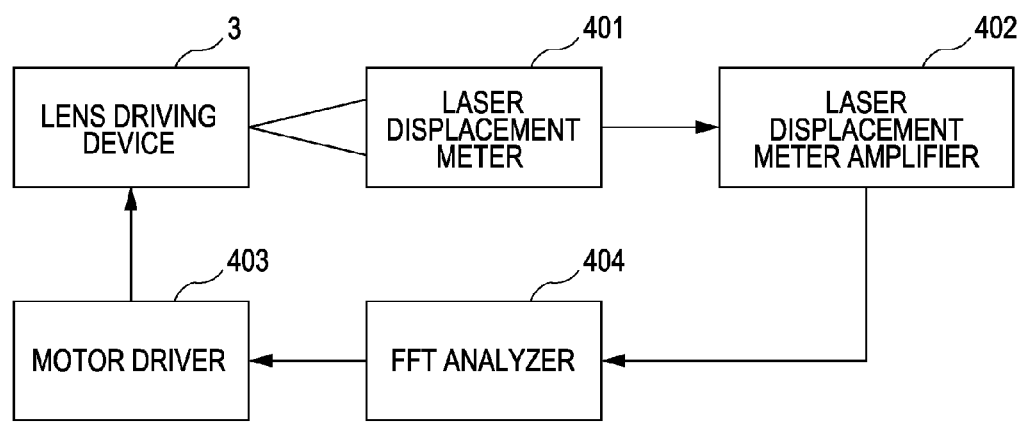
FIG. 11 is a schematic illustration of an experimental apparatus for the lens driving device according to the first exemplary embodiment of the present invention.

Experimental data and the effects of the first exemplary embodiment are described with reference to FIGS. 11 to 13. FIG. 11 is a schematic illustration of an experimental apparatus. A signal output from a fast Fourier transform (FFT) analyzer 404 was applied to a coil via a motor driver 403 so as to drive the lens driving device 3. A response from the lens driving device 3 was measured using a laser displacement meter 401. The measured value was input to the FFT analyzer 404 via a laser displacement meter amplifier 402 so that the frequency response was obtained.

Figure 12:
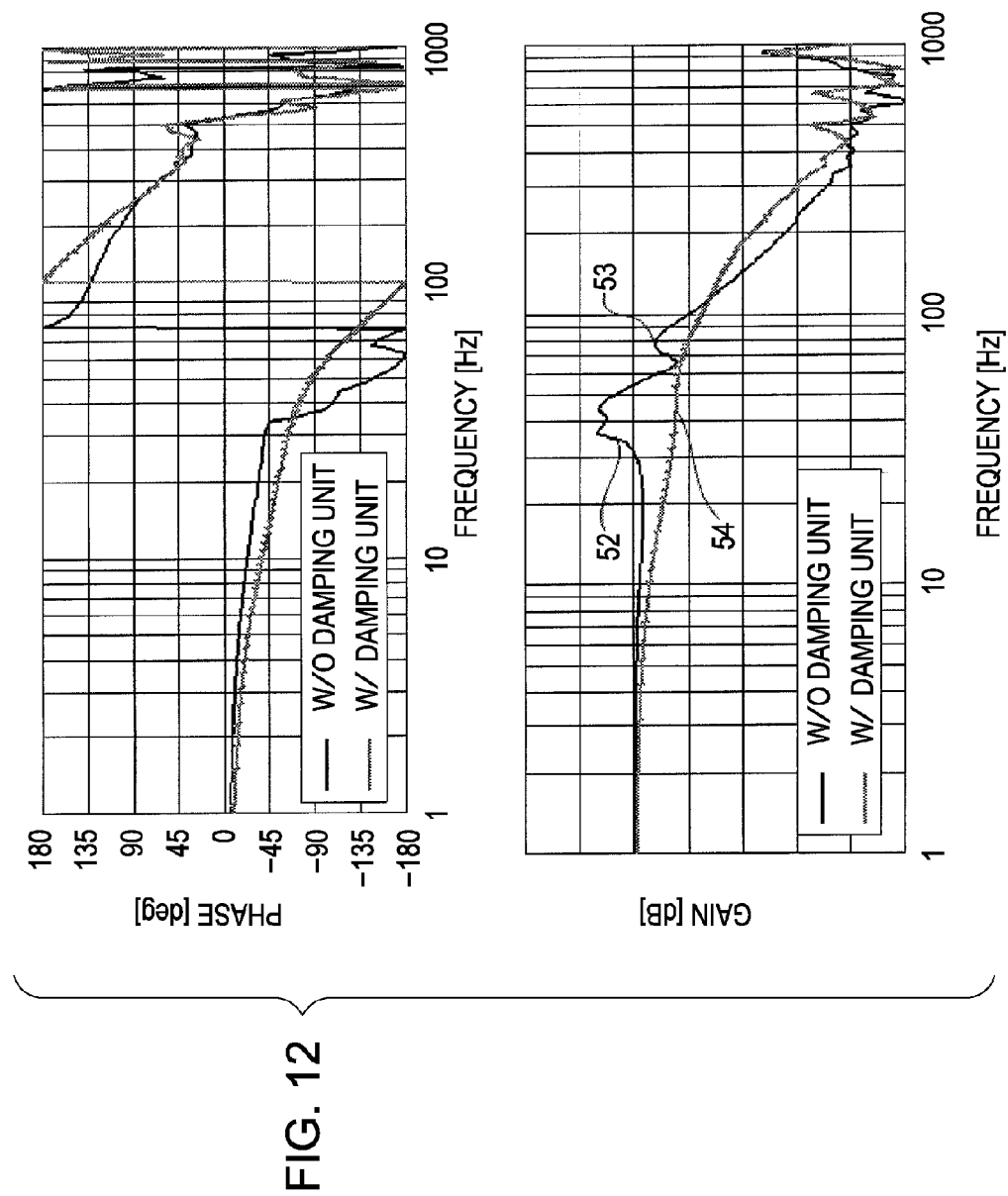
FIG. 12 illustrates experimental data of the frequency response of the lens driving device according to the first exemplary embodiment of the present invention.

FIG. 12 illustrates experimental data of the frequency response for the cases where a damping unit is present and a damping unit is not present. In the experiment shown in FIG. 12, a movable part and an elastic member were used so that the mass of the movable part was about 5 g and the resonance frequency was about 40 Hz. The damping unit was made from TB3168 available from ThreeBond Co., Ltd. by appropriately curing TB3168 using ultraviolet light. A neodymium magnet was partitioned into two portions, each of which was magnetized. A soft magnetic material was used for a magnet attraction plate. An adhesive polyurethane copper wire was used for a coil. By applying an electrical current to the coil, a driving force is generated in proportion to the electrical current, and the coil moves to a position at which a resultant force of the elastic members matches the driving force. At that time, it is desirable that the resultant force of the elastic members and the driving force do not generate a moment. However, a moment is generated due to, for example, an assembly-to-assembly variation. Thus, a rolling movement (hereinafter simply referred to as "rolling") about the light axis is produced. As shown in FIG. 12, when the damping unit is not present, a resonance peak 52 at about 40 Hz corresponds to a resonance in a direction of the driving force. A resonance peak 53 at about 80 Hz corresponds to an unwanted resonance caused by the rolling. As can be seen from FIG. 12, since this mechanism has a small friction and a small viscous resistance, the resonance peaks 52 and 53 are high. In contrast, when the damping unit is present, any resonance peak does not appear even at about 60 Hz at which the phase is delayed by 90 degrees. Accordingly, stable controllability can be provided. As can be seen, the gain and the phase vary in a frequency range higher than about 10 Hz. However, this negative impact can be reduced by a phase compensation unit, which is described later.

Figure 13:
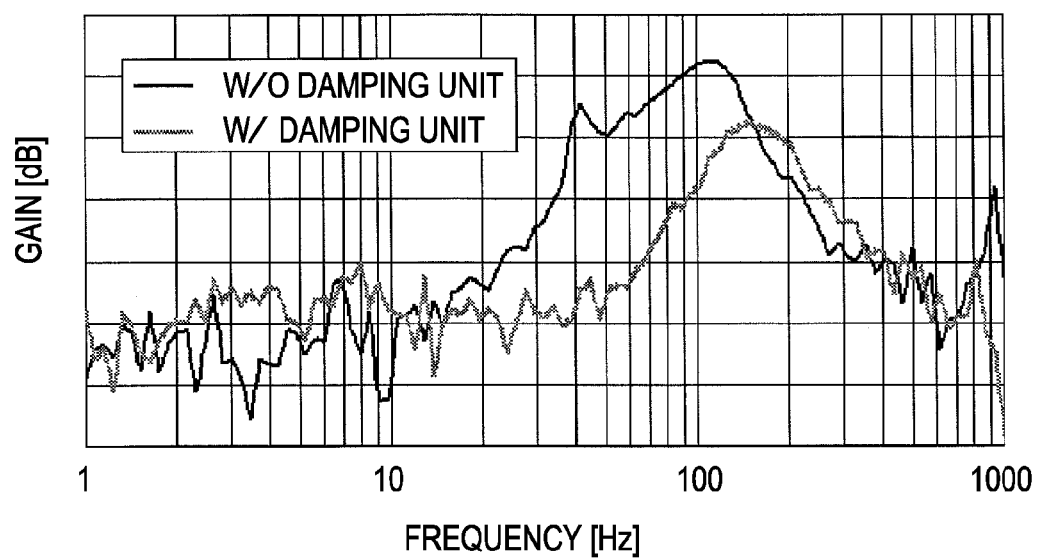
FIG. 13 illustrates a frequency-response diagram of crosstalk of the lens driving device according to the first exemplary embodiment of the present invention.

FIG. 13 illustrates an experimentally obtained leakage (hereinafter referred to as "crosstalk") of the movement in one axis direction into other axis directions. In a feedback control, some amounts of crosstalk are allowable since the crosstalk is corrected on the basis of a sensor output. However, in an open control, the crosstalk needs to be small. The crosstalk is caused by an assembly error of the elastic member and the driving device, and therefore, it is difficult to completely eliminate the crosstalk. In addition, when rolling is induced, crosstalk noticeably appears. As shown in FIG. 13, by providing a damping unit at an appropriate location, the rolling can be reduced, and therefore, the crosstalk can be reduced. For example, the damping unit can be provided at a location at which a large velocity is induced when rolling occurs. According to the first exemplary embodiment, the damping unit is disposed at a location separated from the light axis by a relatively large distance. Since the first exemplary embodiment can reduce the crosstalk, the first exemplary embodiment is particularly effective for apparatuses using an open control.

An optimum control of the lens driving device 3 according to the first exemplary embodiment is described next with reference to FIGS. 14 to 17.

Figure 14:
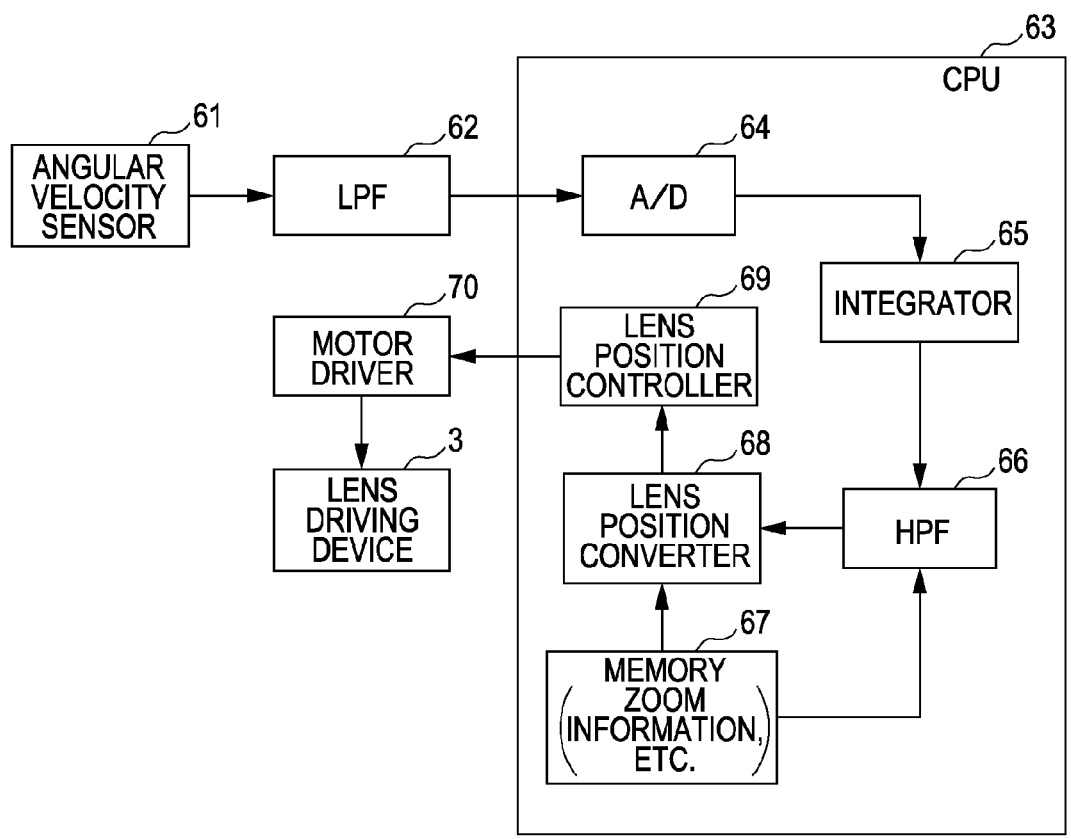
FIG. 14 is a block diagram of a control signal processing system of the lens driving device according to the first exemplary embodiment of the present invention.

FIG. 14 is a block diagram of a signal processing system for generating a control signal of the lens driving device 3. In FIG. 14, an angular velocity sensor 61, a lowpass filter (LPF) 62, and a central processing unit (CPU) 63 are shown. In addition, an A/D converter 64, an integrator 65, a highpass filter (HPF) 66, and a memory 67 for recording information about the image pickup apparatus are shown. Furthermore, a lens position converter 68 for computing the position of the lens, a lens position controller 69, a motor driver 70, and the lens driving device 3 are shown.

As shown in FIG. 14, an angular velocity sensor is widely used for the vibration sensor 8 for detecting vibration, such as a camera shake. The first exemplary embodiment is described with reference to the angular velocity sensor 61. The angular velocity sensor 61 detects an angular velocity caused by, for example, a camera shake and outputs a signal in proportion to the angular velocity. The LPF 62 generally removes noise and, in particular, removes a high-frequency noise of the angular velocity sensor 61. The CPU 63 performs computation required for control of image stabilization. The CPU 63 includes the A/D converter 64, the integrator 65, the HPF 66, the memory 67, the lens position converter 68, and the lens position controller 69. The operations of these components are described in more detail next.

The A/D converter 64 converts a signal that has passed through the LPF 62 to a digital signal at a predetermined sampling rate. It is desirable that the sampling period is 100 times the control frequency range. For example, in the lens driving device 3 that controls a frequency less than or equal to 50 Hz, it is desirable that the A/D converter 64 samples a signal at a sampling rate of about 5000 Hz. Thus, the effect of sampling is negligible. The integrator 65 integrates an angular velocity signal so as to obtain an angle of a camera shake. The HPF 66 removes a low-frequency fluctuation of the angular velocity sensor 61. The filter time constant is appropriately determined while considering the low-frequency fluctuation and the control frequency range. In addition, the HPF 66 can acquire shooting conditions, such as zoom information, from the memory 67 so as to appropriately change the filter time constant. The lens position converter 68 computes an amount of movement of the lens driving device 3 (more specifically, the compensation lens 12) for the input vibration using information about zoom and focus stored in the memory 67. The lens position controller 69 performs appropriate phase compensation while taking into consideration the frequency characteristic of the lens driving device 3. In addition, the lens position controller 69 outputs the result of the process to the motor driver 70 so as to control the lens driving device 3.

Figure 15:
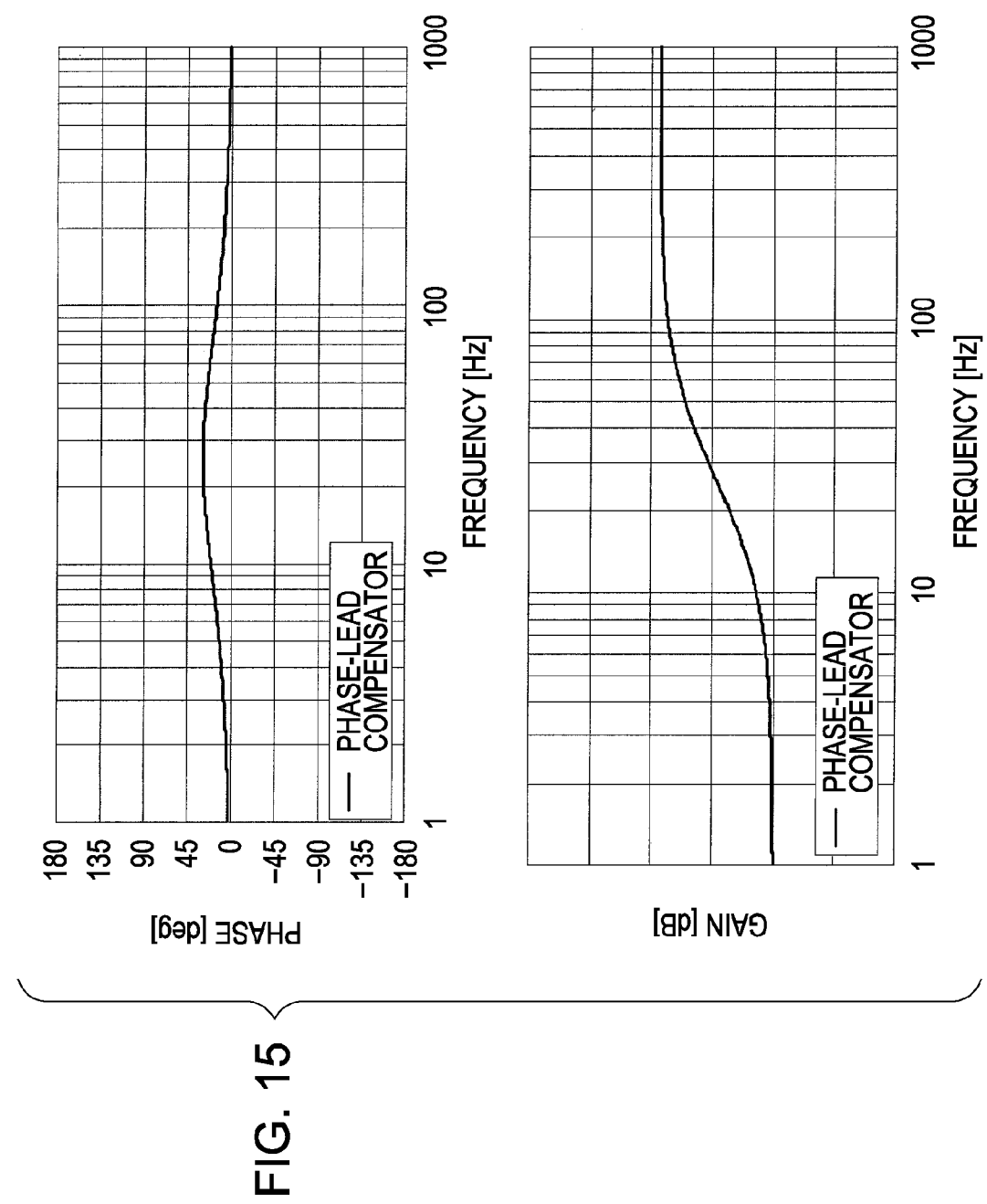
FIG. 15 illustrates a frequency-response diagram of a lens position controller included in the control signal processing system shown in FIG. 14.

FIG. 15 illustrates an example of the frequency response of a phase compensator included in the lens position controller 69. This phase compensator is a first-order phase-lead filter that reduces the load of the CPU 63. Accordingly, even a low-performance and relatively low-cost CPU can be used. If the power of the CPU is so low that the CPU does not perform an additional process, the lens position controller 69 can be simply composed of a resistor and a capacitor outside the CPU. However, if the CPU has a sufficient power, a higher-order phase filter can be configured so that controllability higher than that described in the first exemplary embodiment can be provided.

Figure 16:
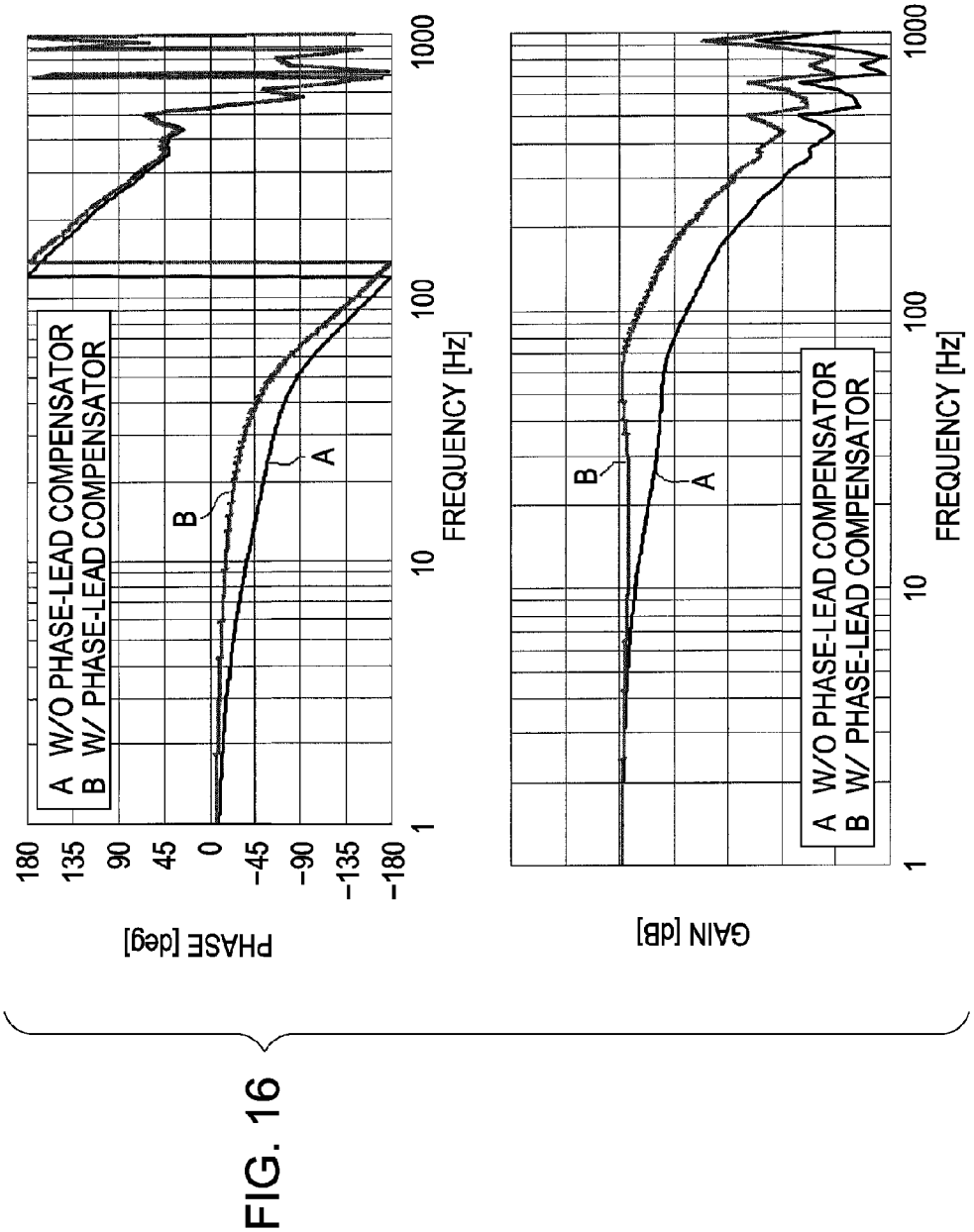
FIG. 16 is a frequency-response diagram illustrating frequency responses before and after a phase compensator is applied to an image stabilizing unit according to the first exemplary embodiment of the present invention.

FIG. 16 is a frequency response diagram illustrating the frequency responses before and after the phase compensator shown in FIG. 15 is provided. As can be seen from FIG. 16, flat portions of the gain and phase continue to a high frequency region. This indicates that, even in an open control, the mechanism can compensate for a high-frequency camera shake (vibration).

Figure 17:
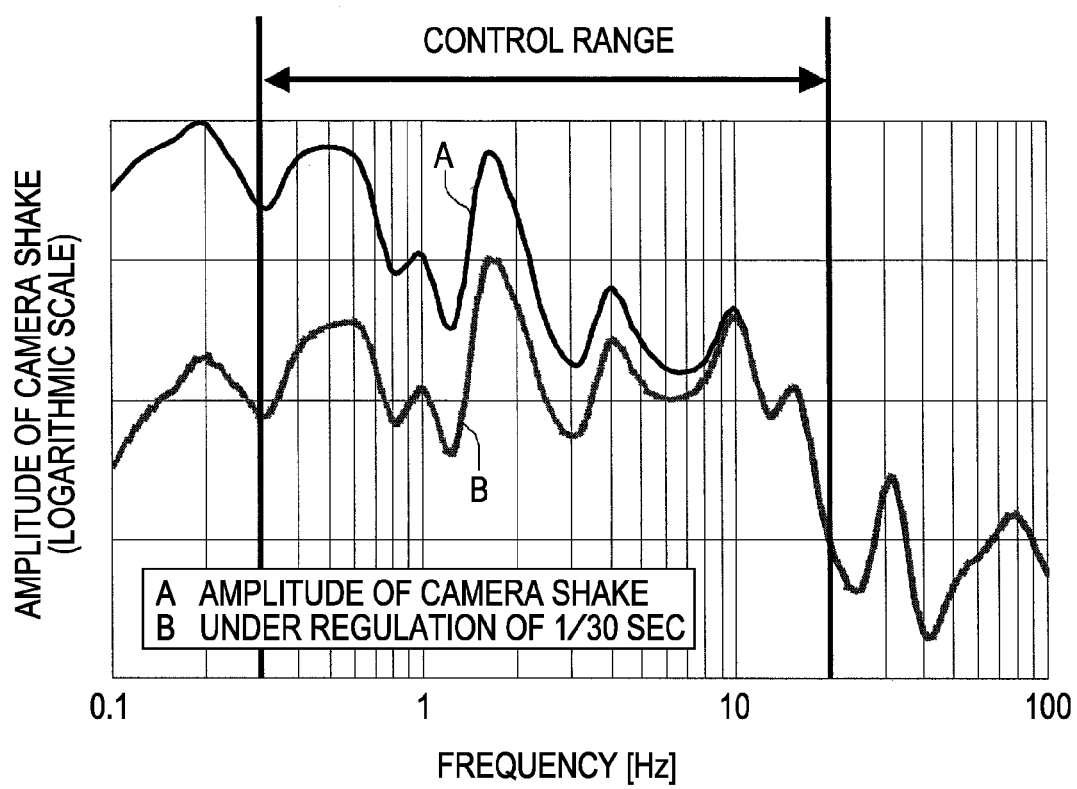
FIG. 17 illustrates a typical amplitude of a camera shake according to the first exemplary embodiment of the present invention.

FIG. 17 illustrates a typical amplitude of the camera shake in the frequency region. The ordinate represents a power spectrum corresponding to the amplitude of the vibration. The scale of the ordinate is logarithmic. Each scale mark denotes a value ten times larger than the preceding one. As can be seen from FIG. 17, the amplitude of the vibration decreases towards higher frequencies. This indicates that the affect of vibration of a high frequency is relatively smaller than that of a low frequency. In addition, it is sufficient that the camera shake is reduced during a time period determined by a shutter speed when a still image is captured and during a time period determined by a frame rate when a moving image is captured. Accordingly, the effect of the vibration of a low frequency is relatively small. FIG. 17 also illustrates the amplitude of the vibration in the frequency under the restriction of 1/30 sec. A region in which the amplitude is large at that time can be determined to be the control range. The shutter speed and the frame rate can be determined to be appropriate values in accordance with the performance of the image pickup apparatus. In FIG. 17, the control range is defined as a range between about 0.3 Hz and about 20 Hz.

As for the mechanism shown in FIG. 17, the mechanism according to the first exemplary embodiment has a control range of a frequency less than or equal to 100 Hz. An objective lens actuator of an optical disk has a control range of as high as several kHz. Since an actuator that should respond in such a high frequency region needs to use a region close to the glass region 51c shown in FIG. 7, a viscoelastic material imposes load on the actuator. Accordingly, a viscoelastic material cannot be directly disposed between the movable part and the fixed part. However, according to the first exemplary embodiment, the control range is located in a low-frequency range less than or equal to 100 Hz and the bandwidth is small. Accordingly, the transition region of a viscoelastic material shown in FIG. 7 can be utilized.

A relationship between an amount of movement of the movable lens barrel and the damping unit in a control state is described next. In the above-described open control, the driving range may be electrically limited due to the limitation of an electrical current. Let c denote an amount of movement of the movable lens barrel in the control state. It is desirable that the damping unit 45 is not significantly deformed and is used in a range in which no permanent deformations take place (i.e., a range in which the elastic coefficient linearly changes). Therefore, it is desirable that the following condition is satisfied:

$$b > c \quad (9)$$

where b represents the distance described in FIG. 6C. To avoid an occurrence of permanent deformation, it is more desirable that the following condition is satisfied:

$$0.5b > c \quad (10)$$

As noted above, according to the first exemplary embodiment, the lens driving device 3 can provide the following features:
1) Optimum damping in a mechanism having low friction
2) Easy assembly and low cost
3) Excellent control performance even under the open control.

Second Exemplary Embodiment

A second exemplary embodiment of the present invention is described below with reference to FIGS. 18 to 28. Features of components of the image pickup apparatus shown in FIGS. 1 and 2 have been described in the first exemplary embodiment. Therefore, descriptions are not repeated.

Figure 18:
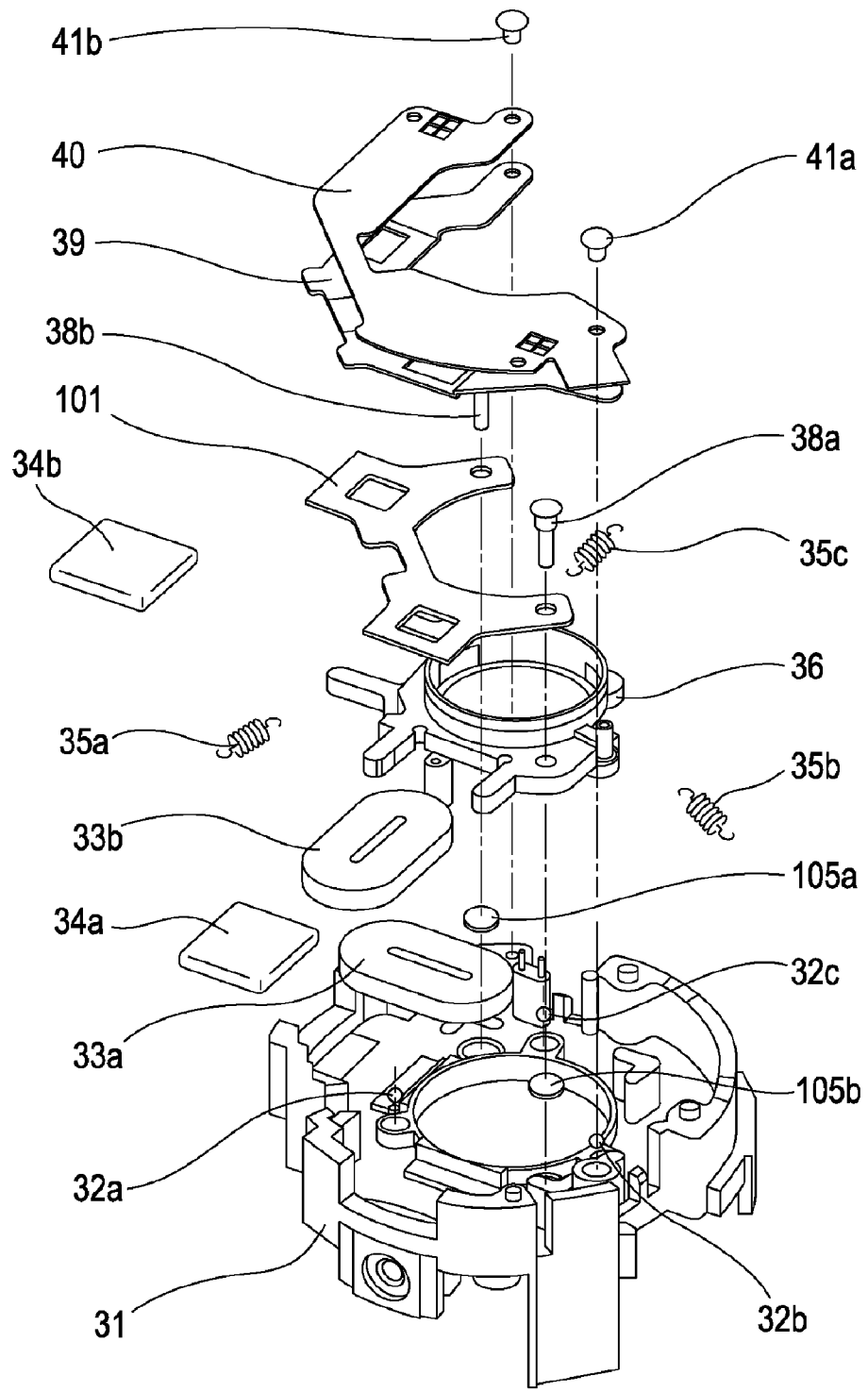
FIG. 18 is an exploded perspective view of an example lens driving device according to a second exemplary embodiment of the present invention.

A lens driving device 3 which is a main component of the second exemplary embodiment is described next with reference to FIGS. 18 to 28. FIG. 18 is an exploded perspective view of the lens driving device 3. Similar numbering will be used in describing FIG. 18 as was utilized above in describing the lens driving device 3 according to the first exemplary embodiment. The lens driving device 3 includes a magnet attraction plate 101. The magnet attracting plate 101 is different from the magnet attraction plate 37 according to the first exemplary embodiment in that the magnet attracting plate 101 has an appropriate hole. As can be seen from FIG. 18, a mechanism according to the second exemplary embodiment can be expanded to one side of the base plate 31. Thus, the mechanism can be easily assembled. As a result, the productivity can be increased and the cost can be decreased.

Figure 19A:
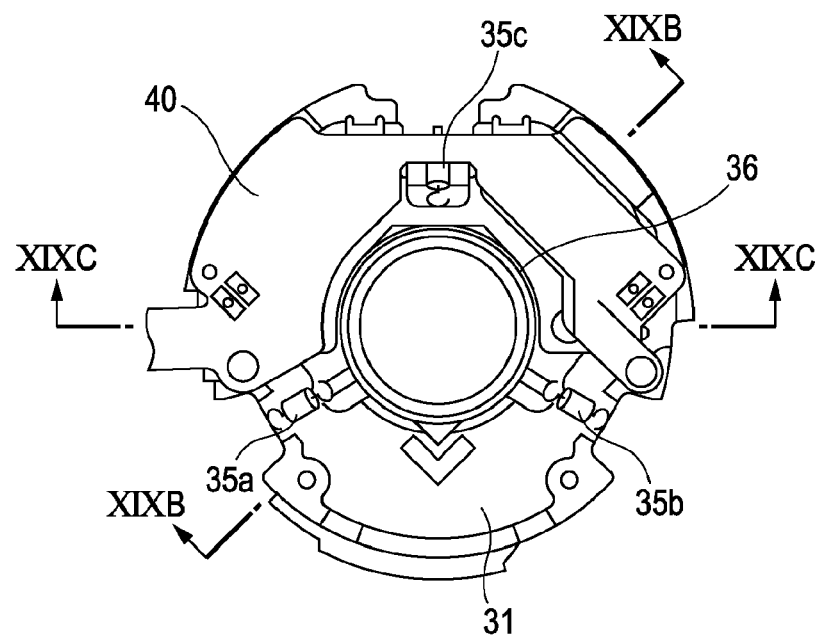
Figure 19B:
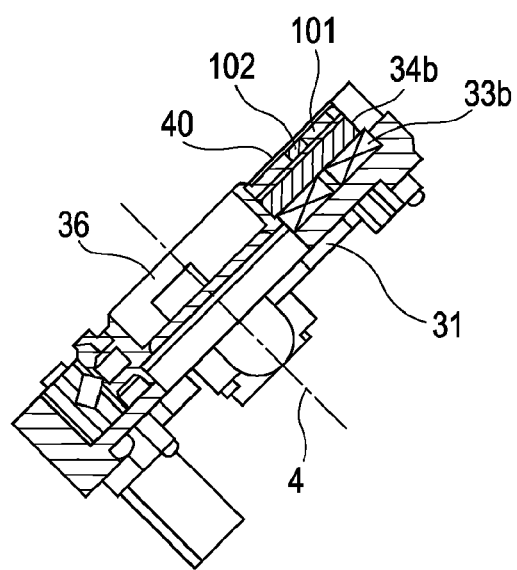
FIGS. 19B to 19D are cross-sectional views of the lens driving device shown in FIG. 19A.
Figure 19C:
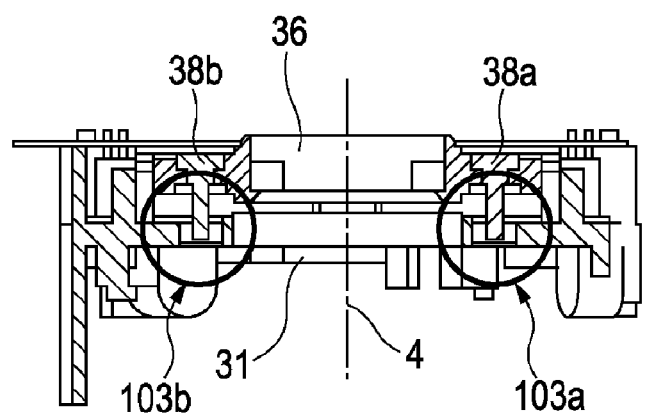
Figure 19D:
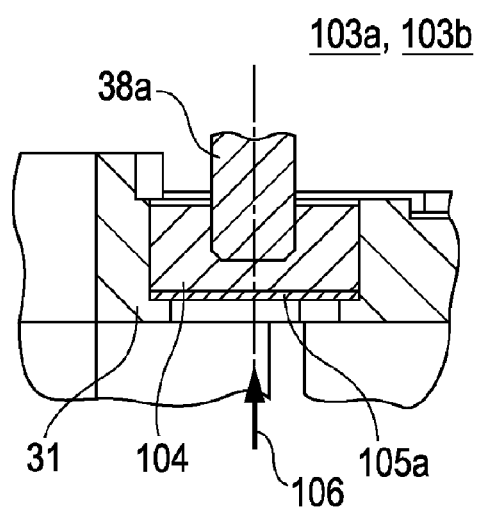

FIGS. 19A to 19D are diagrams illustrating the structure of the lens driving device 3. More specifically, FIG. 19A is a front view of the lens driving device 3 when viewed in the light axis direction. FIG. 19B is a cross-sectional view taken along line XIXB-XIXB of FIG. 19A. FIG. 19C is a cross-sectional view taken along line XIXC-XIXC of FIG. 19A. FIG. 19D is a detail view of a damping unit mounting portion shown in FIG. 19C.

As shown in FIGS. 19A to 19D, a movable part is supported in a manner similar to that according to the first exemplary embodiment. That is, a movable lens barrel 36 is elastically supported by elastic members 35a, 35b, and 35c on the base plate 31. According to the second exemplary embodiment, the three elastic members 35a, 35b, and 35c radially extend from the light axis. The elastic members 35a, 35b, and 35c are spaced circumferentially at 120° intervals. This symmetric arrangement can prevent unwanted resonance excitation caused by an occurrence of moment. In addition, the elastic members 35a, 35b, and 35c are tilted in the light axis direction at an appropriate angle and grasp the balls 32a, 32b, and 32c disposed between the base plate 31 and the movable lens barrel 36. A method for determining the elastic coefficients of the elastic members 35a, 35b, and 35c is described later.

The structure of the guide surface of the movable lens barrel 36 of the lens driving device 3 is similar to that shown in FIG. 4B according to the first exemplary embodiment.

An actuator included in the lens driving device 3 is described next with reference to FIGS. 19B, 20 and 21. The actuator serves as a driving unit of the lens driving device 3. The actuator has a structure similar to that shown in FIG. 4C. That is, by energizing coils 33a and 33b of the actuator, a relative movement occurs between the base plate 31 and the movable lens barrel 36. A difference between the actuators according to the first and second exemplary embodiments is that the actuator according to the second exemplary embodiment has a sensor 102 on the side of the surfaces of magnets 34a and 34b opposite the coils 33a and 33b. According to the second exemplary embodiment, the actuator is of a moving magnet type. Accordingly, a hall element is employed for the sensor 102. The sensor 102 is secured to the base plate 31 via an FPC 40. The sensor 102 detects the position of the movable lens barrel 36 using a change in the density of magnetic flux. In addition, by disposing the sensor 102 at the above-described location, the magnet 34a for drive can be used for position detection.

Figure 20A:
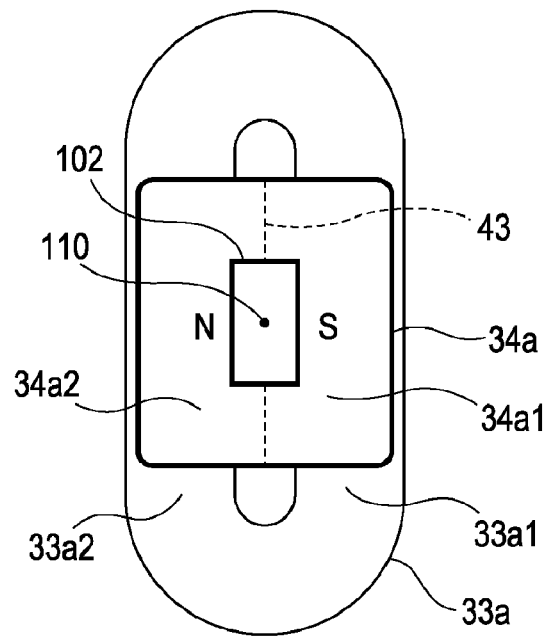
FIGS. 20A and 20B are a plan view and a side view of an actuator included in the lens driving device according to the second exemplary embodiment of the present invention, respectively.
Figure 20B:
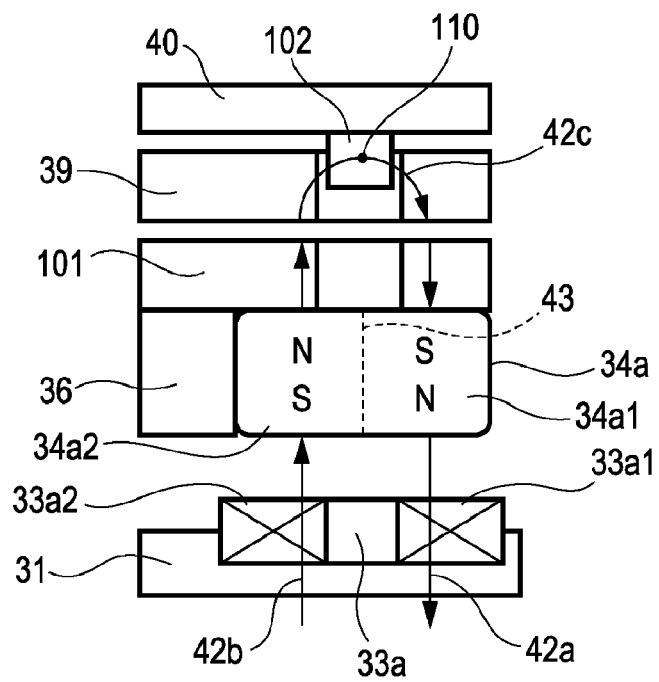

FIGS. 20A and 20B are schematic illustrations of the actuator. FIG. 20A is a view of the magnet 34a, the coil 33a, and the sensor 102 when viewed in the light axis direction. FIG. 20B is a cross-sectional view of the magnet 34a when the magnet 34a is cut at substantially the center thereof.

As shown in FIGS. 20A and 20B, the sensor 102 includes a magnetic flux sensing portion 110. In a magnetic circuit shown in FIG. 20B, magnetic field lines 42a, 42b, and 42c travels in directions indicated by arrows in FIG. 20B. In a state shown in FIG. 20B, the magnetic flux sensing portion 110 is located immediately above a magnetized boundary 43. Accordingly, the magnetic field at this point is substantially zero. When a relative movement between the base plate 31 and the movable lens barrel 36 occurs, the magnetized boundary 43 is moved together with the movable lens barrel 36 from a viewpoint of the sensor 102 secured to the base plate 31. Therefore, the magnetic field at the position of the magnetic flux sensing portion 110 is non-zero.

Figure 21:
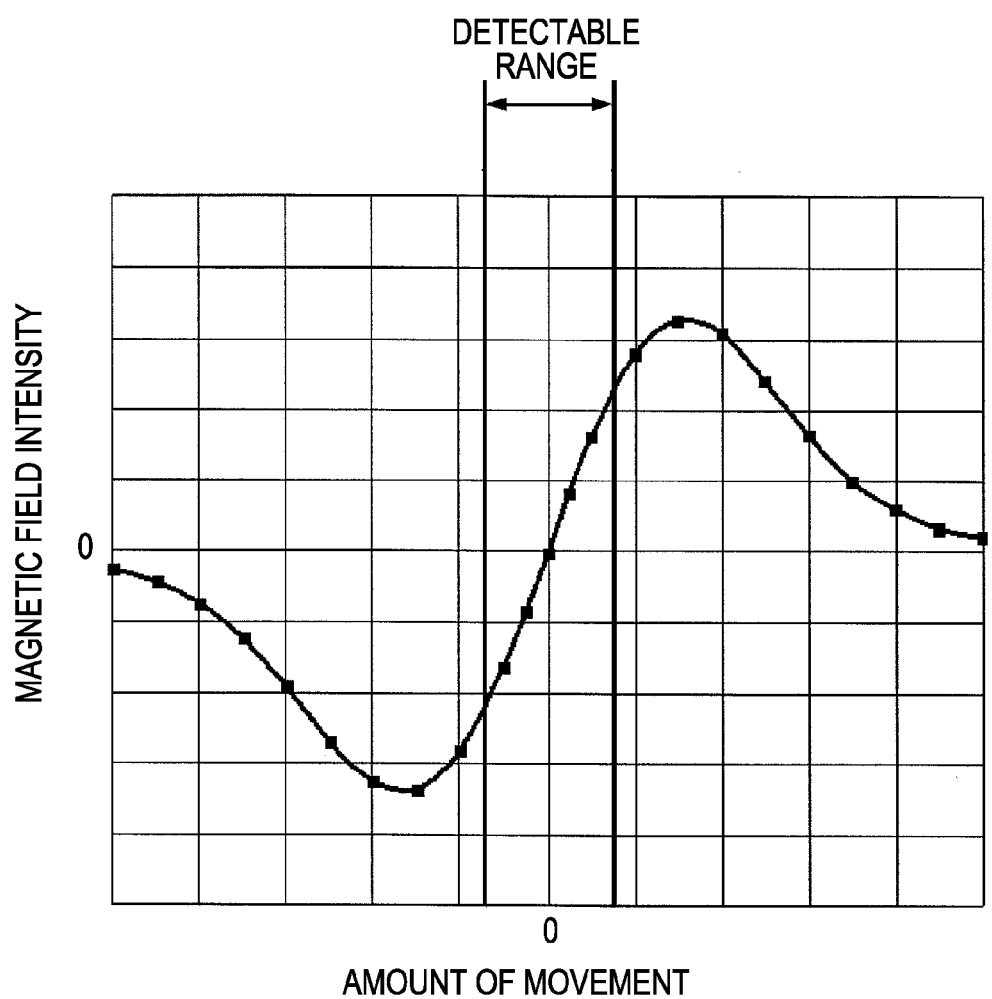
FIG. 21 is a magnetic flux distribution diagram according to the second exemplary embodiment of the present invention.

This operation is experimentally performed and the strength of the magnetic flux is shown in FIG. 21. In FIG. 21, a movement of zero indicates the state in which the magnetic flux sensing portion 110 is located immediately above the magnetized boundary 43, as shown in FIG. 20B. As can be seen from FIG. 21, there is a linear relationship between the amount of movement and the strength of a magnetic field in a certain range. In this range, the position can be linearly determined.

A method for attaching the damping unit is described next with reference to FIGS. 19C and 19D. As shown in FIGS. 19C and 19D, the lens driving device 3 includes damping unit mounting portions 103a and 103b, a damping unit 104, and ultraviolet light-transparent plates 105a and 105b. An arrow 106 indicates a direction in which an ultraviolet ray is irradiated. Like the first exemplary embodiment, the damping unit mounting portions 103a and 103b are disposed at symmetric locations with respect to the light axis, as shown in FIG. 19C. FIG. 19D is an enlarged view of the damping unit mounting portion 103a or 103b. As shown in FIG. 19D, magnet attraction plate fixing screws 38a and 38b are screwed to the movable lens barrel 36. Thereafter, each of the magnet attraction plate fixing screws 38a and 38b extends towards a hole formed in the base plate 31 so as to at least partially overlap the base plate 31 in the light axis direction but so as not to pass completely through to the other side of the hole. After the ultraviolet light-transparent plate 105a is mounted on the base plate 31, the damping unit 104 is poured. Thereafter, the movable lens barrel 36 is attached. Finally, the damping unit 104 is irradiated with an ultraviolet light beam in a direction indicated by the arrow 106 so as to be cured. A viscoelastic material of the damping unit 104 is similar to that used for the first exemplary embodiment.

Optimal control of the lens driving device 3 according to the second exemplary embodiment with reference to FIGS. 22 to 25.

Figure 22:
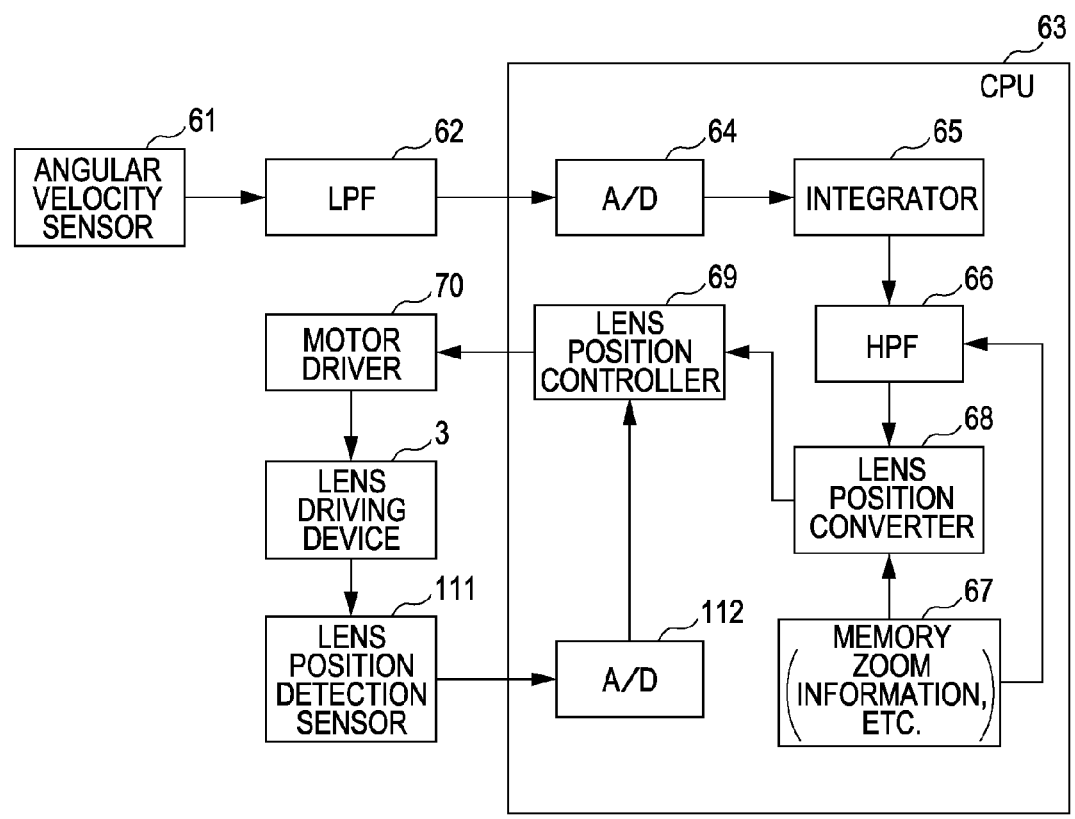
FIG. 22 is a block diagram of a control signal processing system of an image stabilizing unit according to the second exemplary embodiment of the present invention.

FIG. 22 is a block diagram of a signal processing system for generating a control signal of the lens driving device 3. Similar numbering will be used in describing FIG. 22 as was utilized above in describing the lens driving device 3 shown in FIG. 14 according to the first exemplary embodiment. The lens driving device 3 includes a lens position detection sensor 111 and an A/D converter 112.

As shown in FIG. 22, a CPU 63 appropriately process a signal output from an angular velocity sensor 61, as in the first exemplary embodiment. According to the second exemplary embodiment, the lens position controller 69 performs feedback control. Accordingly, the lens position controller 69 controls the compensation lens using positional information about the lens obtained through the lens position detection sensor 111 and the A/D converter 112.

Figure 23:
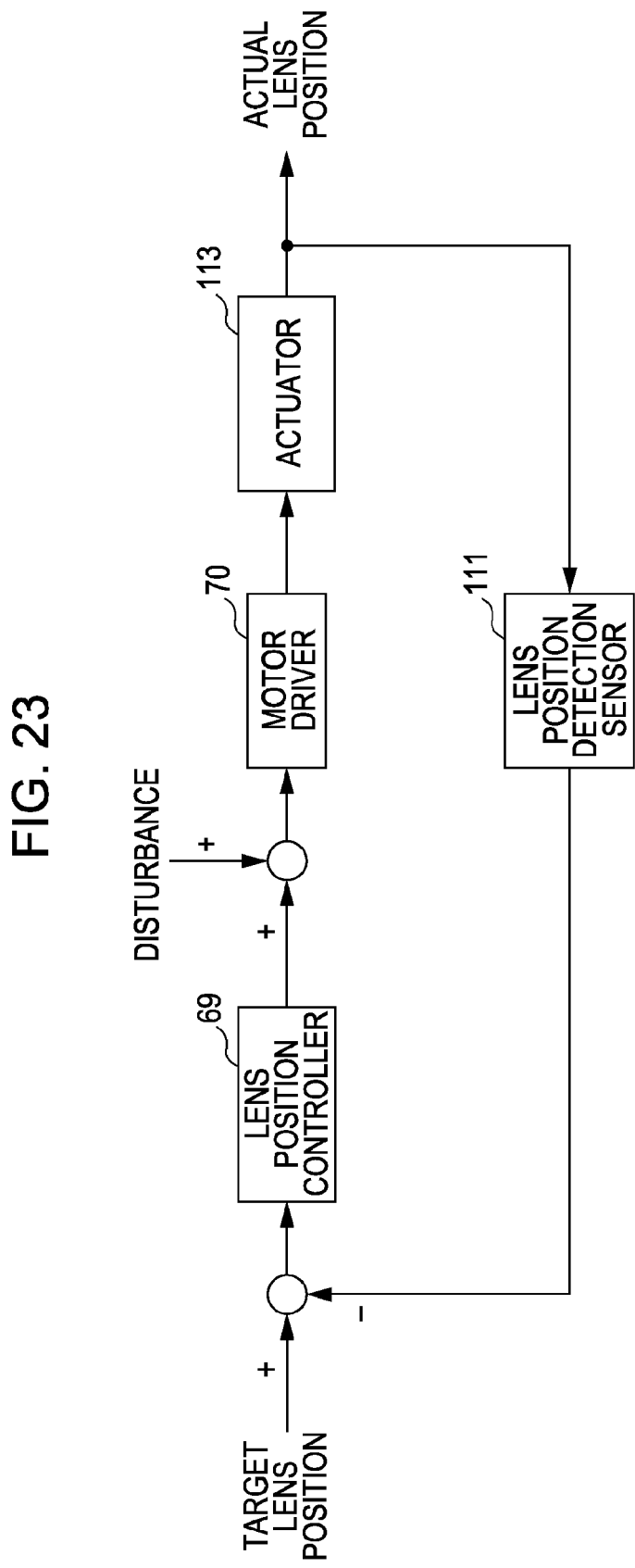
FIG. 23 is a block diagram illustrating feedback control performed by the lens driving device according to the second exemplary embodiment of the present invention.

FIG. 23 is a block diagram illustrating the feedback control. In FIG. 23, the term "target lens position" refers to a target position given by the lens position converter 68. In addition, it is assumed that the sampling rate is one for sampling using a frequency sufficiently higher than the control range. That is, the sampling does not cause a phase delay. In FIG. 23, the sampling can be considered to be continuous. In practice, it is unnecessary that the lens driving device 3 used for image stabilization provides a high-frequency response. Therefore, the assumption above is legitimate.

As shown in FIG. 23, let $G2(s)$ denote a transfer function of the lens position controller 69, Gd denote a driver gain of the motor driver 70, and $G1(s)$ denote a transfer function of an actuator 113 of the lens driving device 3, and Gs denote the gain of the lens position detection sensor 111. Then, an open loop characteristic Gopen(s) is expressed as follows:

$$Gopen(s) = GdG1(s)G2(s) \tag{11}$$

Furthermore, a closed loop characteristic Gclose(s) is expressed as follows:

$$Gclose(s) = (GdGsG1(s)G2(s))/(1 + GdGsG1(s)G2(s)) \tag{12}$$

The frequency-response diagrams at that time are shown in FIGS. 24 to 27.

Figure 24:
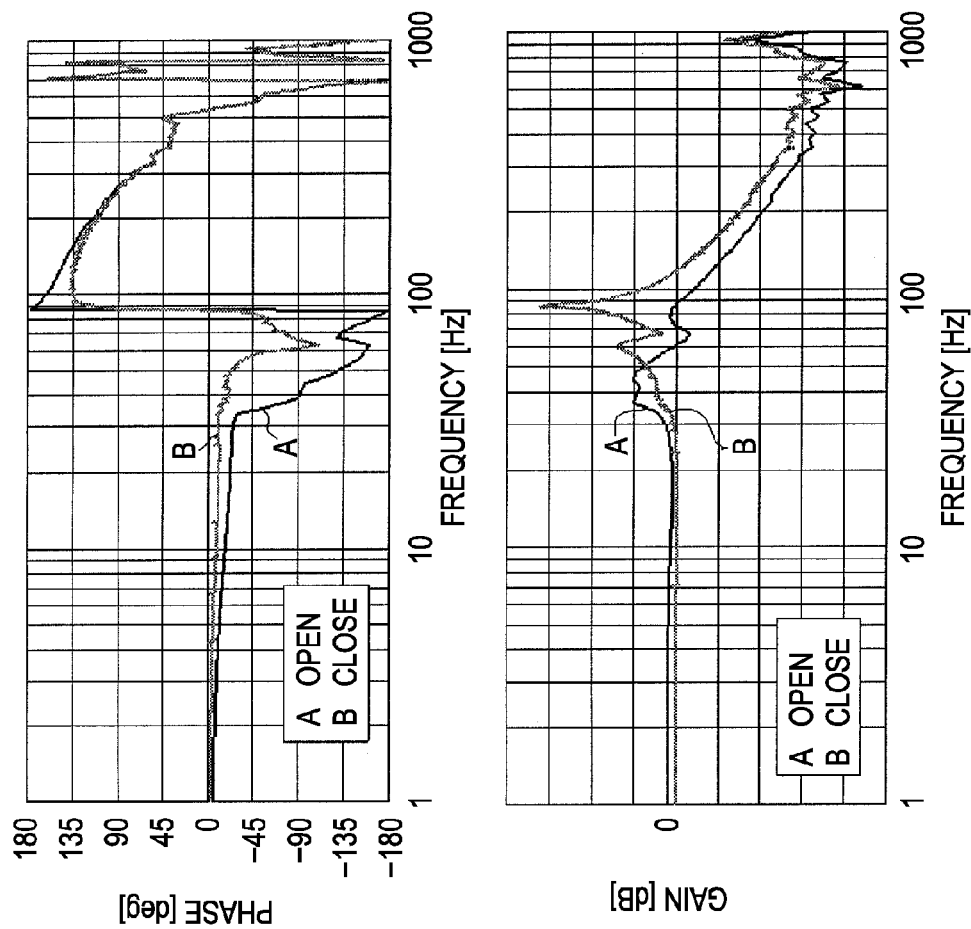
FIG. 24 is a frequency-response diagram of the feedback control according to the second exemplary embodiment of the present invention.

FIG. 24 illustrates the open loop characteristic (indicated by the term "OPEN") and the closed loop characteristic (indicated by the term "CLOSE") in the case where a damping unit is not employed. According to the second exemplary embodiment, to simplify the control system, the lens position controller 69 is formed from a first-order phase-lead compensator.

Figure 25:
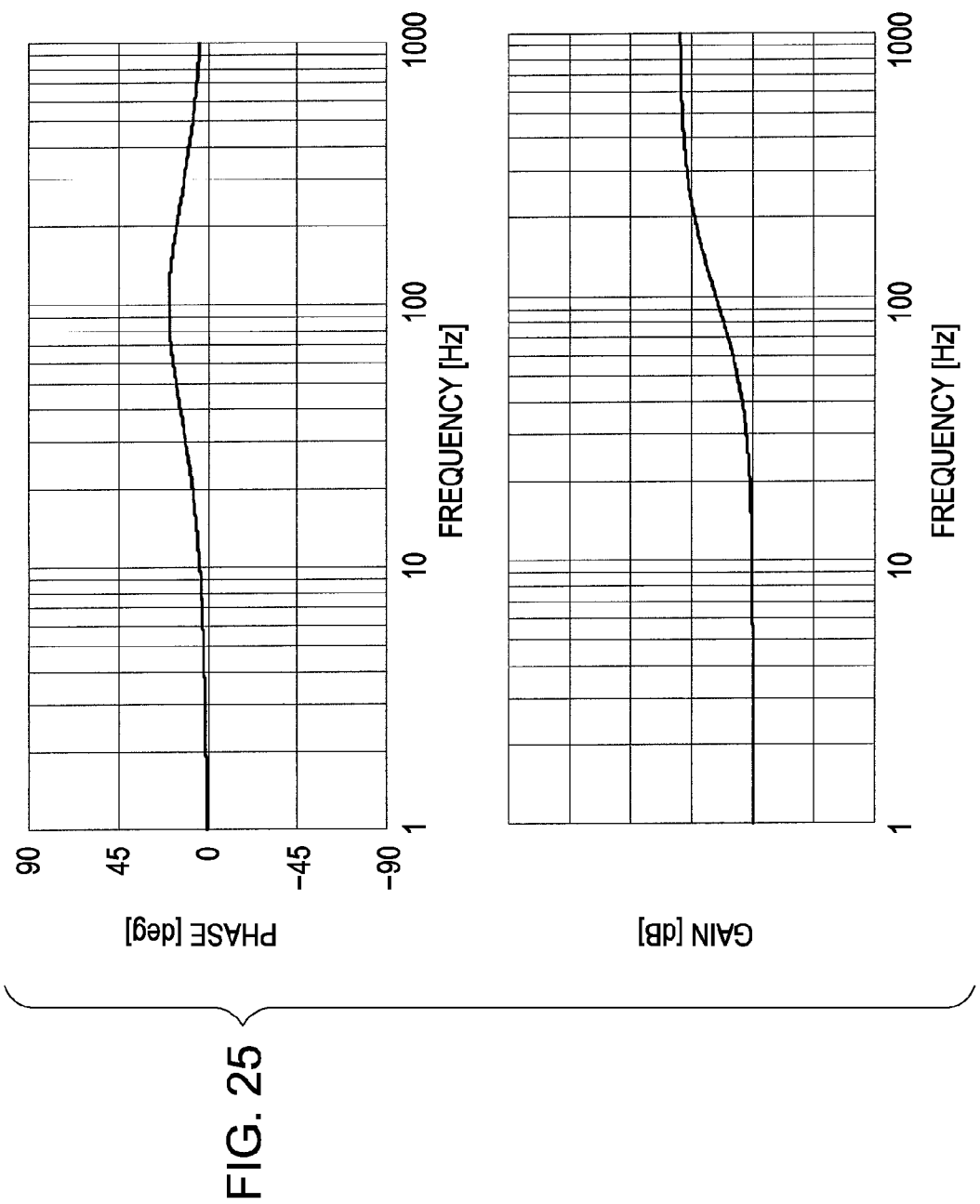
FIG. 25 is a frequency-response diagram of a phase-lead compensator included in the image stabilizing unit according to the second exemplary embodiment of the present invention.

FIG. 25 is a frequency-response diagram of the phase-lead compensator shown in FIG. 24. Even when the phase-lead compensator shown in FIG. 25 is employed, it is difficult to sufficiently increase the crossover frequency when a phase margin is taken into account. In an example shown in FIG. 24, the crossover frequency appears at about 60 Hz and the phase margin is about 30 deg. It is desirable that a region in which the phase-lead compensator advances the phase is in a lower frequency range. However, it is difficult because a spurious frequency appears at about 80 Hz. Accordingly, the sensitivity at low frequencies cannot be increased, and therefore, the crossover frequency cannot be increased. As the crossover frequency is increased, the phase margin is decreased. Consequently, the control system oscillates. Since the crossover frequency cannot be sufficiently increased, a phase delay occurs at low frequencies even in the closed loop characteristic. As a result, a sufficient performance of the image stabilizing unit of the image pickup apparatus cannot be possibly obtained when the lens driving device is installed.

Figure 26:
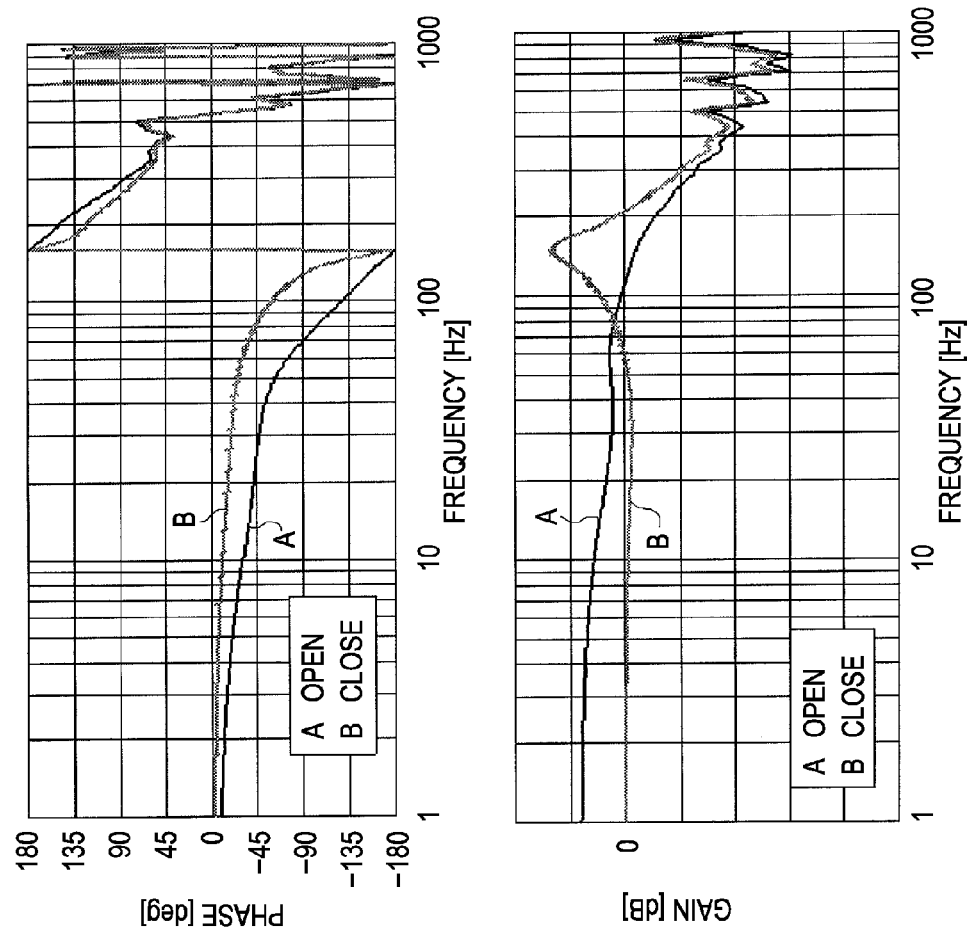
FIG. 26 is a frequency-response diagram of the feedback control according to the second exemplary embodiment of the present invention.
Figure 27:
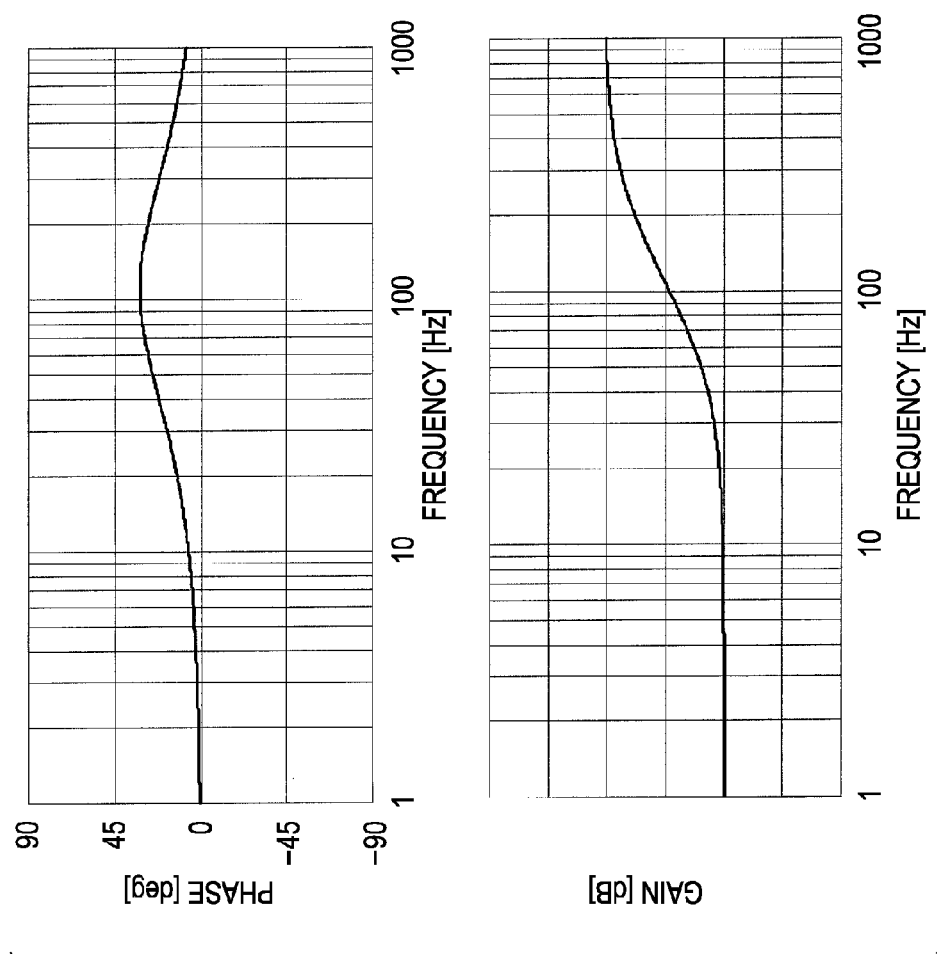
FIG. 27 is a frequency-response diagram of the phase-lead compensator included in the image stabilizing unit according to the second exemplary embodiment of the present invention.

FIG. 26 illustrates the open loop characteristic (indicated by the term "OPEN") and the closed loop characteristic (indicated by the term "CLOSE") in the case where a damping unit is employed. FIG. 27 is a frequency-response diagram of the phase-lead compensator shown in FIG. 26. When the phase-lead compensator, as shown in FIG. 27, is employed, the crossover frequency can be set at about 100 Hz. In addition, a phase margin of about 45 deg. can be obtained, and therefore, a very stable control system can be achieved. Since a high crossover frequency can be set, a phase delay can be prevented from a low frequency to a relatively high frequency. According to the second exemplary embodiment, an optimum design of the open loop characteristic is made while taking into account this closed loop characteristic. That is, the elastic coefficient of the elastic member that supports the movable lens barrel 36 can be appropriately determined so as to obtain a desired resonance frequency in the open loop characteristic.

As can be seen from the comparison between FIGS. 24 and 26, by employing the optimum damping unit 104, the above-described desired characteristic can be obtained even in an apparatus performing feedback control.

An adverse impact of disturbance is described with reference to FIGS. 23 and 28. A transfer function Gnoise(s) from disturbance shown in a block diagram of FIG. 23 to an actual lens position can be expressed as follows:

$$\text{Gnoise}(s) = (GdG1(s))/(1 + GdGsG1(s)G2(s)) \tag{13}$$

Figure 28:
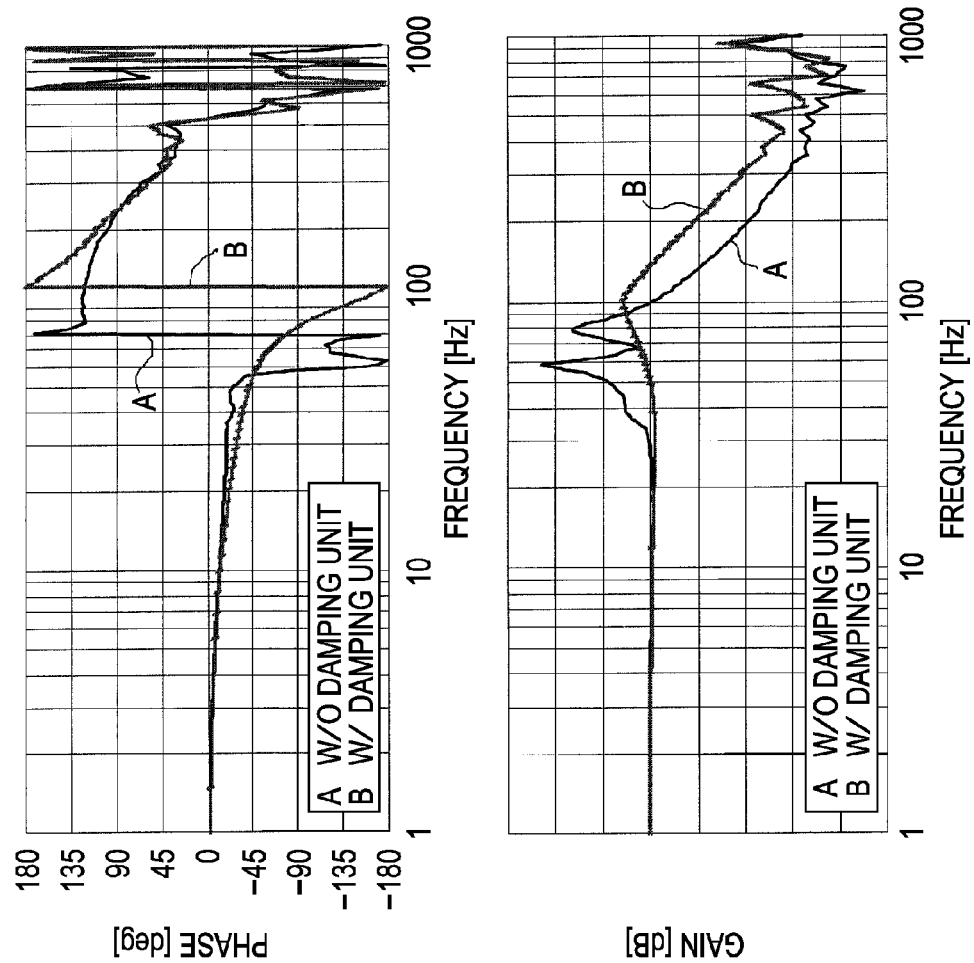
FIG. 28 is a frequency-response diagram of disturbance provided to the feedback control according to the second exemplary embodiment of the present invention.

A frequency-response diagram of this function is shown in FIG. 28. As can be seen from FIG. 28, when the damping unit 104 is employed, the gain for the disturbance at the actual lens position is smaller than that in the case when the damping unit 104 is not employed. Thus, the adverse impact of disturbance is small.

As noted above, according to the second exemplary embodiment, the lens driving device 3 can provide the following features:
1) Optimum damping in a mechanism having low friction
2) Easy assembly and low cost
3) Stable control performance and prevention of a phase delay even under feedback control.

Third Exemplary Embodiment

A third exemplary embodiment of the present invention is described below with reference to FIGS. 29 to 32. Features of components of the image pickup apparatus shown in FIGS. 1 and 2 have been described in the first exemplary embodiment. Therefore, descriptions are not repeated.

Figure 29:
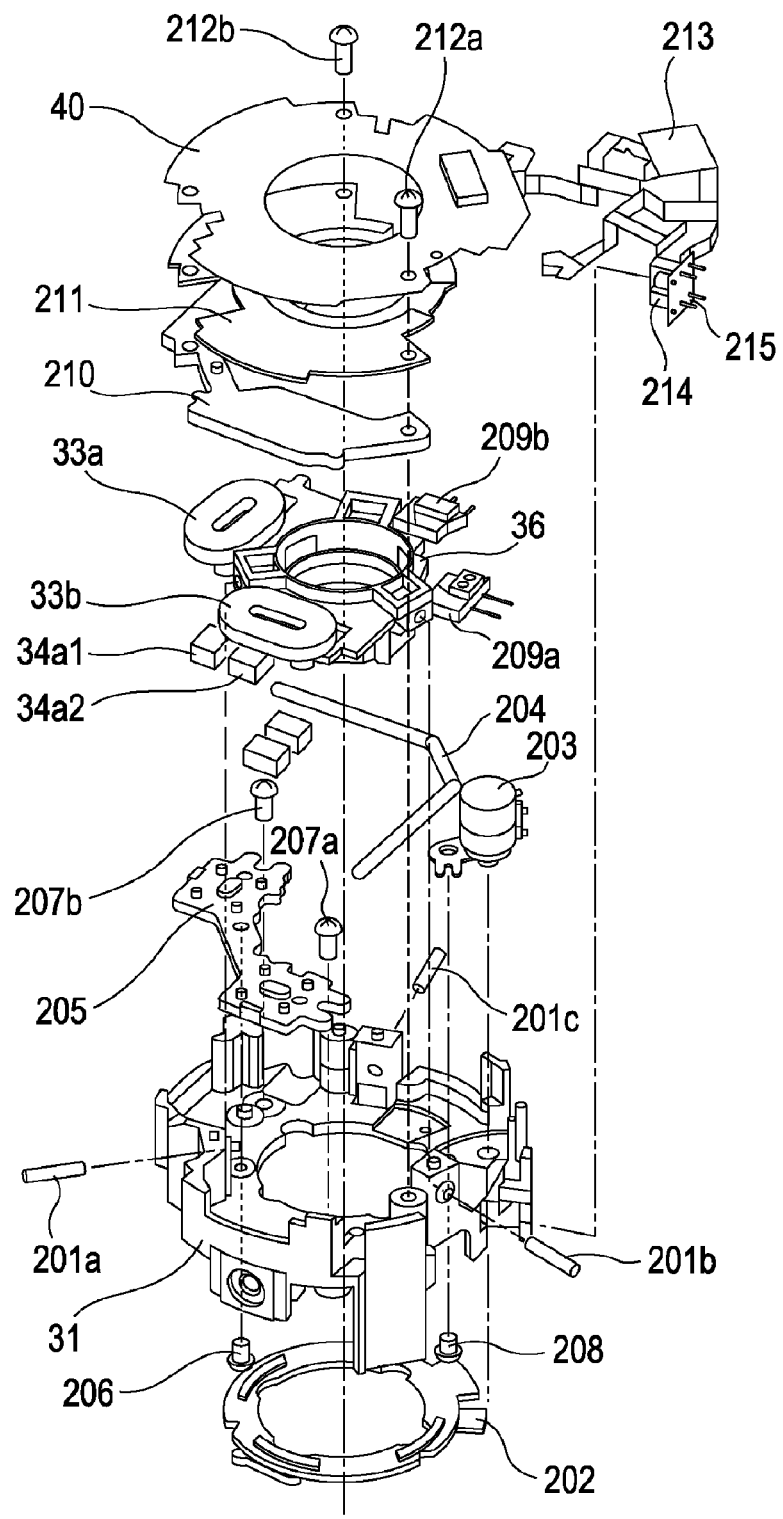
FIG. 29 is an exploded perspective view of an example lens driving device according to a third exemplary embodiment of the present invention.

A lens driving device 3 which is a main component of the third exemplary embodiment is described next with reference to FIGS. 29 to 32. FIG. 29 is an exploded perspective view of the lens driving device 3.

Similar numbering will be used in describing FIG. 29 as was utilized above in describing similar components of the lens driving device 3 according to the first exemplary embodiment. The lens driving device 3 includes slide shafts 201a, 201b, and 201c, a lock ring 202, a lock ring drive motor 203, a rotation prevention bar 204, a fixed yoke 205, and a positioning reference pin 206. The lens driving device 3 further includes screws 207a, 207b, 208, 212a, 212b, and 214, light emitting diodes (LEDs) 209a and 209b, a counter yoke 210, a light shielding plate 211, a relay FPC 213, and a photointerruptor 215.

Coils 33a and 33b and the LEDs 209a and 209b are secured to the movable lens barrel 36. Thus, the coils 33a and 33b and the LEDs 209a and 209b move together with the movable lens barrel 36. The relay FPC 213 is secured to the base plate 31 by use of the screw 214. Electrical power is supplied to the LEDs 209a and 209b, the photointerruptor 215, and the coils 33a and 33b via elastic portions on the relay FPC 213.

Figure 30A:
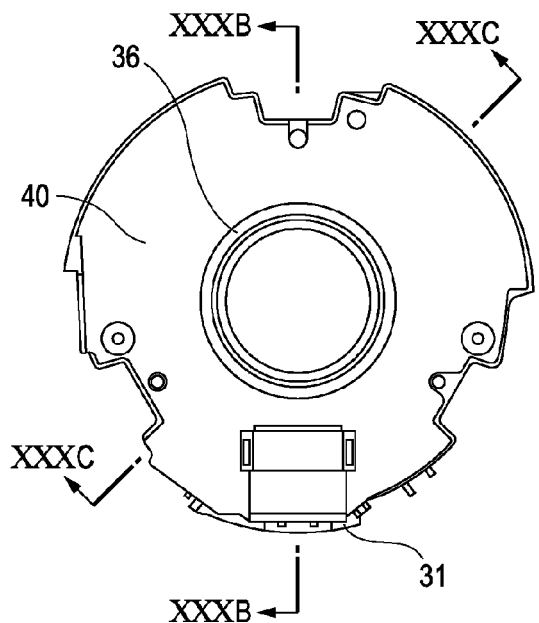
Figure 30B:
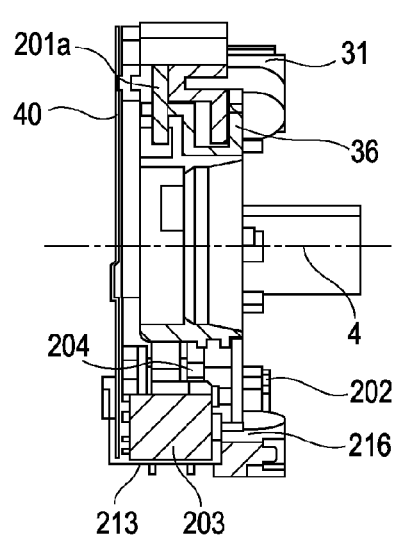
FIGS. 30B and 30C are cross-sectional views of the lens driving device shown in FIG. 30A.
Figure 30C:
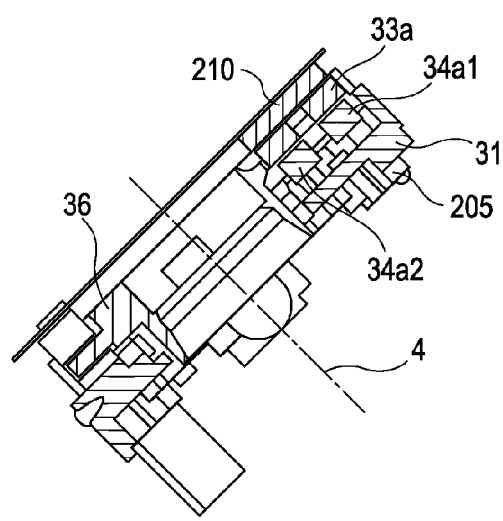

FIGS. 30A to 30C are plan views of the lens driving device 3. More specifically, FIG. 30A is a front view of the lens driving device 3 when viewed in the light axis direction. FIG. 30B is a cross-sectional view taken along line XXXB-XXXB of FIG. 30A. FIG. 30C is a cross-sectional view taken along line XXXC-XXXC of FIG. 30A.

As shown in FIGS. 29 and 30B, the slide shafts 201a, 201b, and 201c are fit to fitting holes formed in the base plate 31 and elongate holes formed in the movable lens barrel 36 so as to be secured to the base plate 31. These three slide shafts and the three elongate holes guide the movement of the movable lens barrel 36 in a plane perpendicular to the light axis. The lock ring 202 is driven via a gear 216 coupled to the lock ring drive motor 203. By rotating the lock ring 202, a state in which the lock ring 202 is in contact with the movable lens barrel 36 and a state in which the lock ring 202 is not in contact with the movable lens barrel 36 can be switched. When the movable lens barrel 36 is driven, the lock ring 202 is not in contact with the movable lens barrel 36 so that an actuator, described below, can drive the movable lens barrel 36. In contrast, when, for example, the image pickup apparatus is powered off, the lock ring 202 is brought into contact with the movable lens barrel 36 so that the movement of the movable lens barrel 36 relative to the base plate 31 is restricted. The photointerruptor 215 can detect the movement of the lock ring 202. The rotation prevention bar 204 has an L shape. By providing appropriate contact points to the rotation prevention bar 204, the rotation prevention bar 204 restricts the rotational movement of the movable lens barrel 36 while allowing the movable lens barrel 36 to move together with the base plate 31 in a plane perpendicular to the light axis.

The actuator in the lens driving device 3 is described next with reference to FIGS. 30C and 31. As shown in FIG. 29C, the fixed yoke 205, the counter yoke 210, and magnets 34a1 and 34a2 are secured to the base plate 31. The coil 33a is secured to the movable lens barrel 36. That is, a moving coil actuator is formed.

Figure 31A:
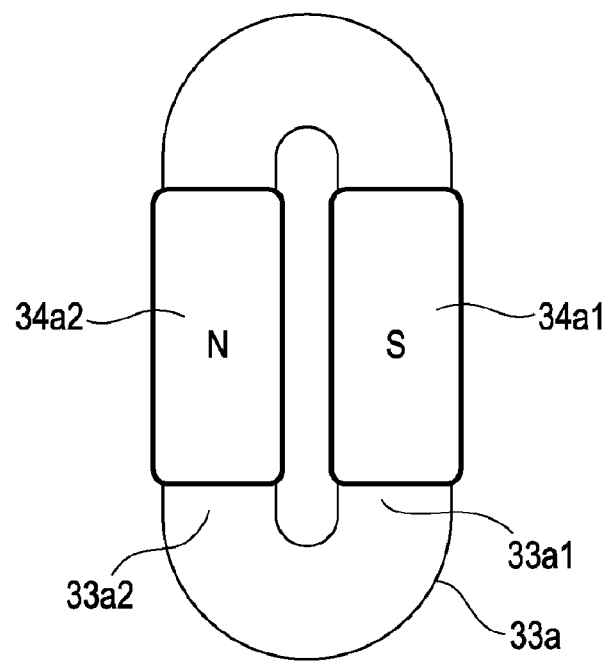
FIGS. 31A and 31B are a plan view and a side view of an actuator included in the lens driving device according to the third exemplary embodiment of the present invention, respectively.
Figure 31B:
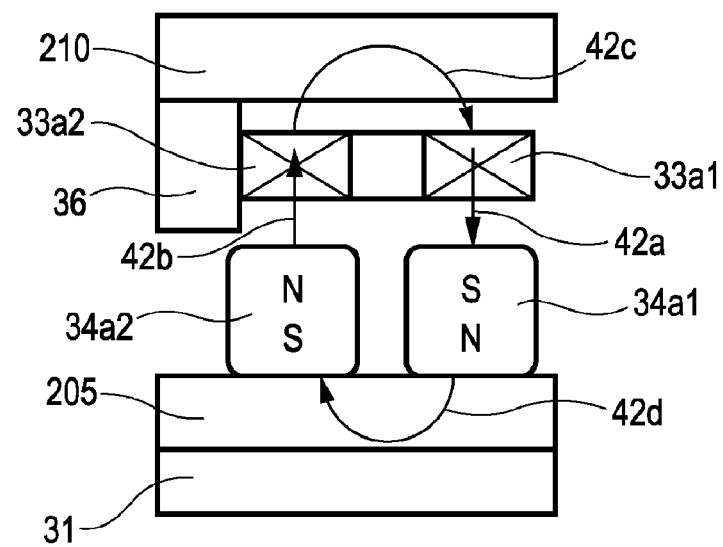

FIGS. 31A and 31B are schematic illustrations of the actuator. FIG. 31A is a view of the magnets 34a1 and 34a2 when viewed in the light axis direction. FIG. 31B is a cross-sectional view of the magnets 34a1 and 34a2 when the magnet magnets 34a1 and 34a2 are cut at substantially the center thereof. As shown in FIG. 31A, the magnets 34a1 and 34a2 are magnetized in opposite directions. In FIG. 31B, magnetic field lines 42a, 42b, and 42c schematically represent typical magnetic lines generated in the vicinities of the magnets 34a1 and 34a2 and the coil 33a. The coil 33a has an oval shape when viewed in the light axis direction. Two long portions 33a1 and 33a2 of the coil 33a face the magnets 34a1 and 34a2, respectively.

As shown in FIG. 31B, the fixed yoke 205 is disposed on surfaces of the magnets 34a1 and 34a2 opposite the coil 33a. It is desirable that the fixed yoke 205 is formed from a soft magnetic material. As shown in FIG. 31B, the fixed yoke 205 allows the majority of magnetic fluxes to pass therethrough so as to decrease the permeance of a magnetic circuit. Furthermore, the counter yoke 210 is disposed on an opposite side of the coil 33a from the magnets 34a1 and 34a2, thus creating a closed magnetic circuit. As a result, the magnetic field lines 42a and 42b emanating from the magnet 34a to the coil 33a are linearly generated. Since the fixed yoke 205 and the counter yoke 210 are secured to the base plate 31, the thicknesses of the fixed yoke 205 and the counter yoke 210 can be freely determined so that the magnetic fluxes are not saturated without concern for the weights thereof. In such a state, when the coil 33a is energized, electric currents flow in the long portions 33a1 and 33a2 in mutually opposite directions that are perpendicular to the plane of FIG. 31B. Accordingly, a driving force given by the Fleming's left-hand rule is generated. As illustrated in FIG. 30B, since the movable lens barrel 36 is guided so as to move in a plane perpendicular to the light axis, the movable lens barrel 36 moves in the plane. By detecting the position of the movable lens barrel 36 using a lens position sensor, described below, and performing feedback control, the movable lens barrel 36 can be moved to any position.

Figure 32A:
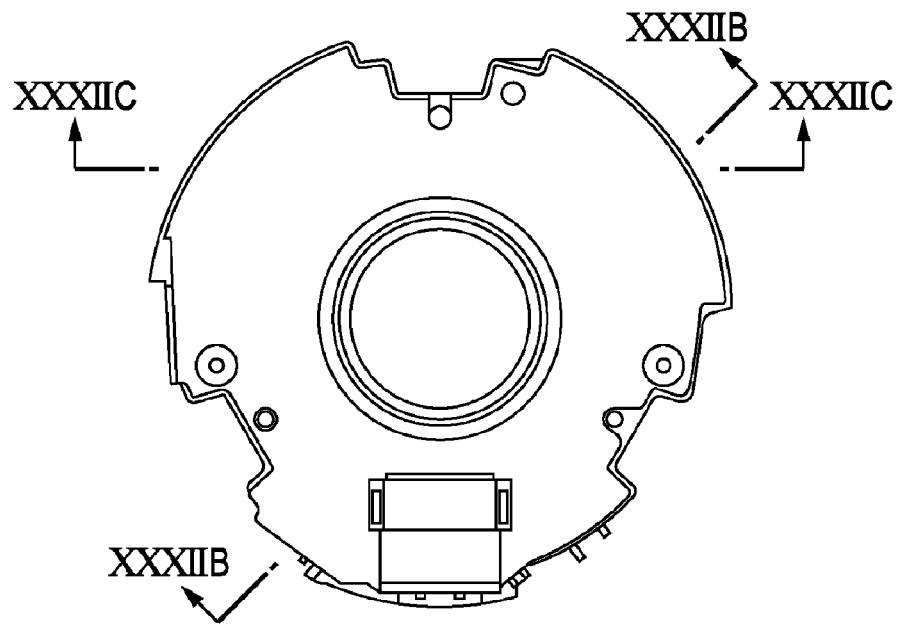
Figure 32B:
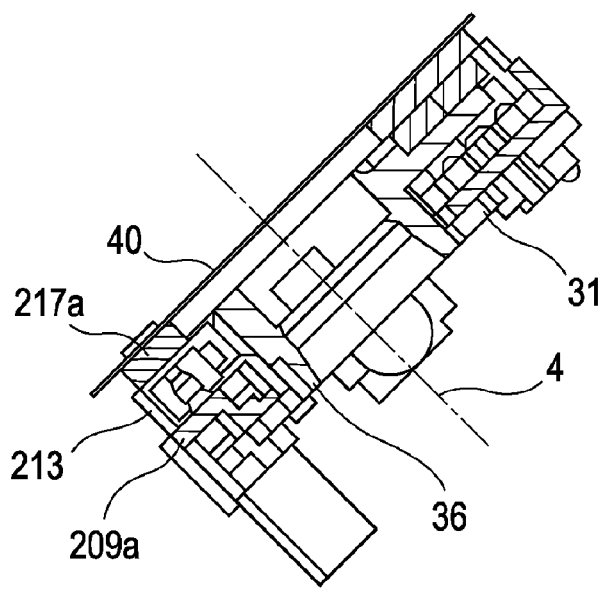
FIGS. 32B to 32D are cross-sectional views of the lens driving device shown in FIG. 32A.
Figure 32C:
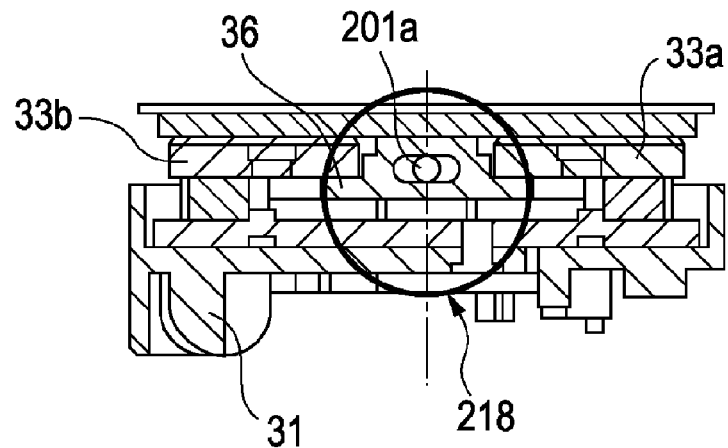
Figure 32D:
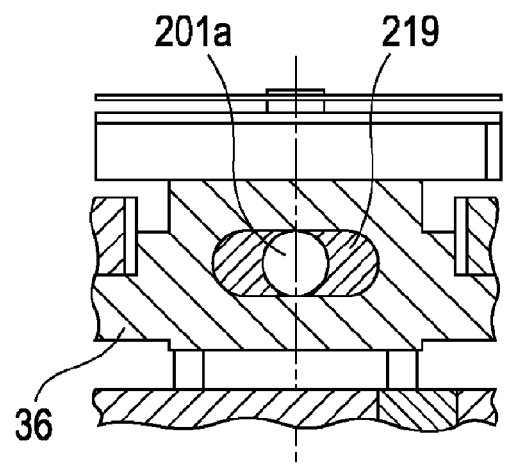

FIGS. 32A to 32D are plan views of the lens driving device 3. More specifically, FIG. 32A is a front view of the lens driving device 3 when viewed in the light axis direction. FIG. 32B is a cross-sectional view taken along line XXXIIB-XXXIIB of FIG. 32A. FIG. 32C is a cross-sectional view taken along line XXXIIC-XXXIIC of FIG. 32A. FIG. 32D is a detail view of a damping unit mounting portion 218 shown in FIG. 32C.

The lens position sensor is described next with reference to FIG. 32B. As shown in FIG. 32B, the lens position sensor includes an infrared light emitting diode (LED) 209a and a one-dimensional position sensitive detector (PSD) 217a secured to the base plate 31 via the FPC 40. In the present exemplary embodiment, for simplicity, position detection in one axis direction is described. However, by using an additional pair consisting of an LED and a one-dimensional PSD or by using a two-dimensional PSD, position detection in two axis directions can be performed. Electrical power is supplied to the LED 209a via the relay FPC 213. The LED 209a starts emitting light when image stabilization starts. The one-dimensional PSD 217a is implemented in the FPC 40. Like the LED 209a, electrical power is supplied to the one-dimensional PSD 217a when image stabilization starts. Since a movement of the movable lens barrel 36 relative to the base plate 31 changes the light intensity distribution on the one-dimensional PSD 217a, the position of the movable lens barrel 36 can be detected. By performing feedback control on the basis of a signal output from the one-dimensional PSD 217a, as in the second exemplary embodiment, the lens position can be controlled so as to be changed to a desired position. In this way, image stabilization can be performed.

A method for mounting a damping unit is described next with reference to FIGS. 32C and 32D. In FIGS. 32C and 32D, the damping unit mounting portion 218 and a damping unit 219 are shown. FIG. 32D is an enlarged partial detail view of the damping unit mounting portion 218 shown in FIG. 32C.

As illustrated in FIG. 30B, the slide shaft 201a is fit to the elongate hole formed in the movable lens barrel 36. According to the third exemplary embodiment, a gap between the slide shaft 201a and the inner surface of the elongate hole is filled with the damping unit 219. In FIGS. 32C and 32D, only part relating to the slide shaft 201a is illustrated. However, gaps around the slide shafts 201b and 201c, which are not illustrated in FIGS. 32C and 32D, are also filled with the damping unit 219. Thus, like the first and second exemplary embodiments, optimum damping can be obtained. In addition, according to the third exemplary embodiment, the damping unit 219 and the driving unit are disposed in substantially the same plane. That is, the center line of the slide shaft 201a (i.e., the center line of the damping unit 219) and the center line of the coils 33a and 33b (i.e., the center line of the driving force of the driving unit) are disposed in substantially the same plane that is perpendicular to the light axis. Such an arrangement can prevent unwanted yawing and pitching motions of the movable lens barrel 36 caused by a force being applied by the damping unit 219.

As noted above, according to the third exemplary embodiment, the lens driving device 3 can provide the following features:
1) Optimum damping
2) Prevention of unwanted yawing and pitching motions
3) Stable control performance and prevention of a phase delay even under feedback control.

Fourth Exemplary Embodiment

A fourth exemplary embodiment of the present invention is described below with reference to FIGS. 33 to 37A-C. Features of components of the image pickup apparatus shown in FIGS. 1 and 2 have been described in the first exemplary embodiment. Therefore, descriptions are not repeated.

A lens driving device 3 which is a main component of the fourth exemplary embodiment is described next with reference to FIGS. 33 to 37A-C.

Figure 33:
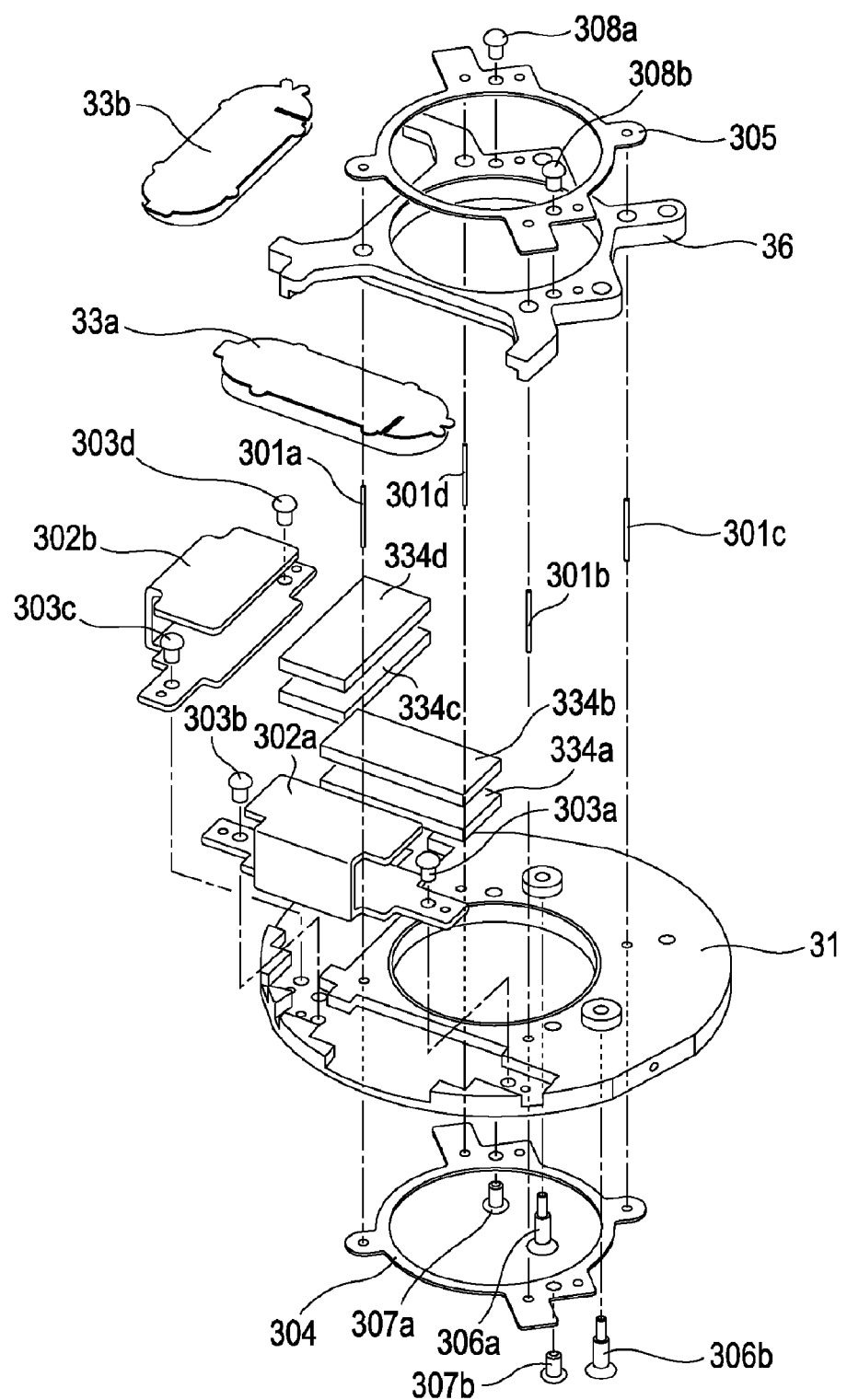
FIG. 33 is an exploded perspective view of a lens driving device according to a fourth exemplary embodiment of the present invention.

FIG. 33 is an exploded perspective view of the lens driving device 3. Similar numbering will be used in describing components shown in FIG. 33 as was utilized above in describing similar components of the image stabilizing unit according to the first exemplary embodiment. The lens driving device 3 includes elastic wires 301a, 301b, 301c, and 301d, fixed yokes 302a and 302b, and screws 303a, 303b, 303c, 303d, 307a, 307b, 308a and 308b. The lens driving device 3 further includes a fixed printed circuit board (PCB) 304, a movable PCB 305, and fixing pins 306a and 306b.

The fixed yokes 302a and 302b are secured to a base plate 31 by use of the screws 303a, 303b, 303c, and 303d. The fixed PCB 304 is secured to the base plate 31 by use of the screws 307a and 307b. The movable PCB 305 is secured to a movable lens barrel 36 by use of the screws 308a and 308b. Magnets 334a and 334b are attracted to the fixed yokes 302a, and magnets 334c and 334d are attracted to the fixed 302b so that the magnets 334a to 334d are fixed to the base plate 31.

Figure 34A:
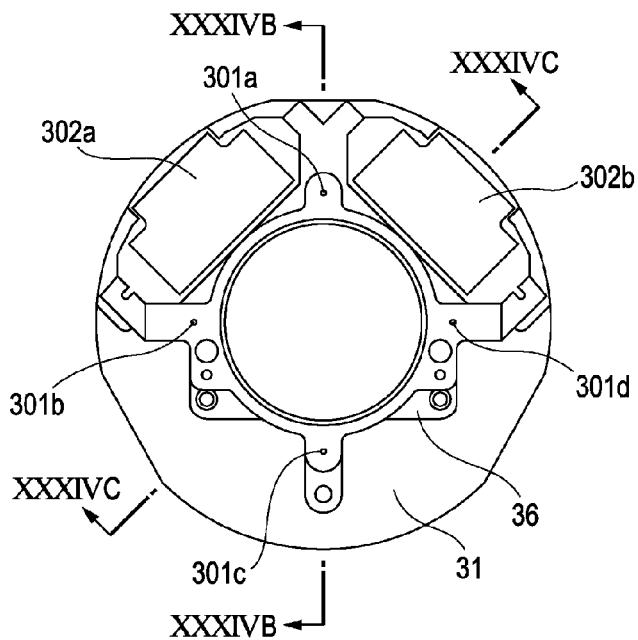
Figure 34B:
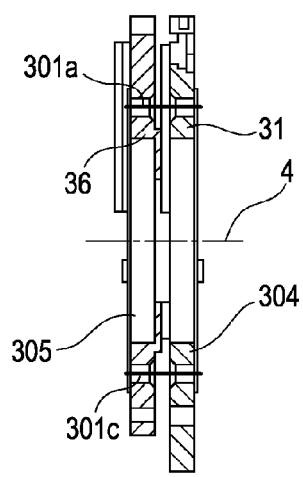
FIGS. 34B and 34C are cross-sectional views of the lens driving device shown in FIG. 34A.
Figure 34C:
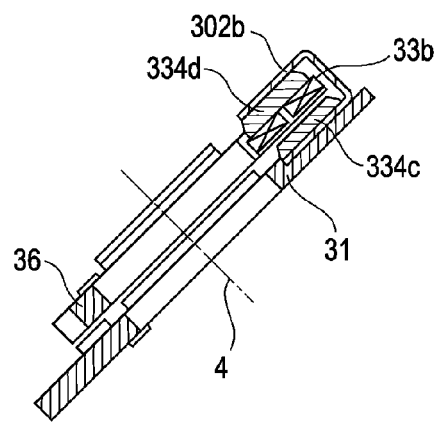

FIGS. 34A to 34C are plan views of the lens driving device 3. More specifically, FIG. 34A is a front view of the lens driving device 3 when viewed in the light axis direction. FIG. 34B is a cross-sectional view taken along line XXXIVB-XXXIVB of FIG. 34A. FIG. 34C is a cross-sectional view taken along line XXXIVC-XXXIVC of FIG. 34A.

Main components of the lens driving device 3 according to the fourth exemplary embodiment are described next with reference to FIG. 33, FIG. 34B, and FIGS. 35A-C. The movable lens barrel 36 is elastically supported by the base plate 31 via the elastic wires 301a, 301b, 301c, and 301d. The elastic wires 301a, 301b, 301c, and 301d are secured to the fixed PCB 304 and the movable PCB 305 by soldering. Thus, the elastic wires 301a, 301b, 301c, and 301d serve as elastic members so as to elastically support the movable lens barrel 36. In addition, the elastic wires 301a, 301b, 301c, and 301d serve as feed lines for feeding electrical power to the coils 33a and 33b. Phosphor-bronze wires or beryllium copper wires are suitably used for the elastic wires 301a, 301b, 301c, and 301d. By disposing the four wires having the same length substantially parallel to the light axis, the movable lens barrel 36 approximately functions as a parallel link mechanism.

Figure 35A:
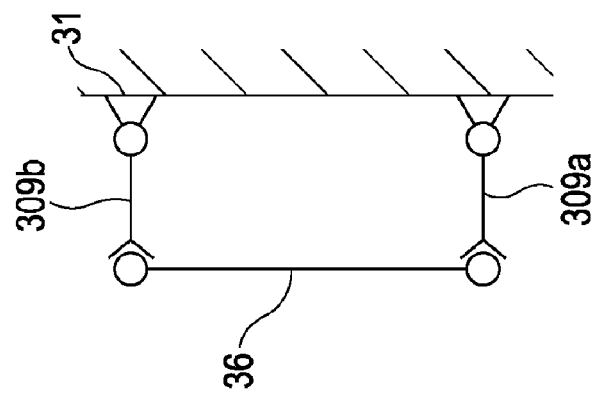
FIGS. 35A to 35C illustrate the movement of a parallel link mechanism in the lens driving device according to the third exemplary embodiment of the present invention.
Figure 35B:
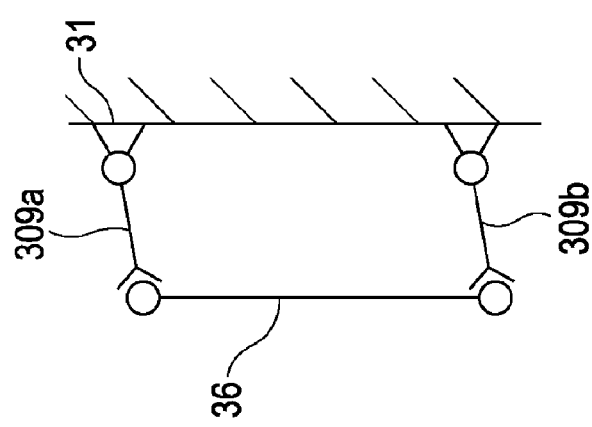
Figure 35C:
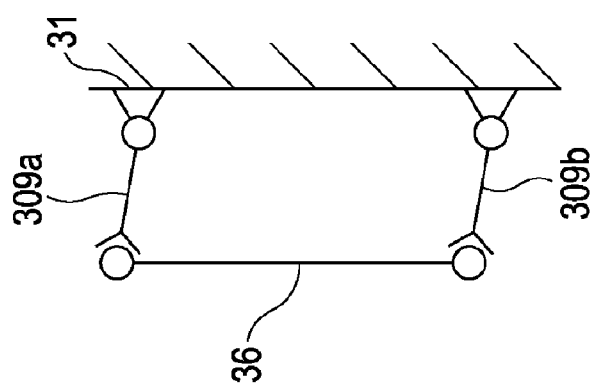

The movement of the parallel link mechanism is schematically illustrated in FIGS. 35A to 35C. As shown in FIGS. 35A to 35C, the elastic wires 301a, 301b, 301c, and 301d are modeled as links 309a and 309b. The elastic wires 301a, 301b, 301c, and 301d are bent so as to generate displacement. In FIGS. 35A to 35C, the displacement due to bending deformation is represented by the rotation of the links. It is assumed that other deformation is not generated, and the links 309a and 309b are rigid bodies. As shown in FIGS. 35A to 35C, by forming the parallel link mechanism, the movable lens barrel 36 can be guided in a direction perpendicular to the light axis without generating an inclination of the movable lens barrel 36. In the parallel link mechanism, a movement in the light axis direction occurs. Let x denote a movable range and l denote the length of a wire. Then, the displacement in the light axis direction is expressed as follows:

$$l(1-\cos(\tan-1(x/l))) \qquad (14)$$

For example, when the movable range is set to ±0.3 mm and the length of the wire is set to about 10 mm, the displacement in the light axis direction is less than or equal to 5 μm. This value is within an allowable range. That is, the movable lens barrel 36 can be guided in a plane that is substantially perpendicular to the light axis without an inclination of the movable lens barrel 36.

An actuator of the lens driving device 3 is described next with reference to FIGS. 34C, 36A, and 36B. As shown in FIG. 34C, a coil fixed yoke 302 and the magnets 334c and 334d are secured to the base plate 31 whereas the coil 33b is secured to the movable lens barrel 36. Thus, a moving coil actuator is formed.

Figure 36A:
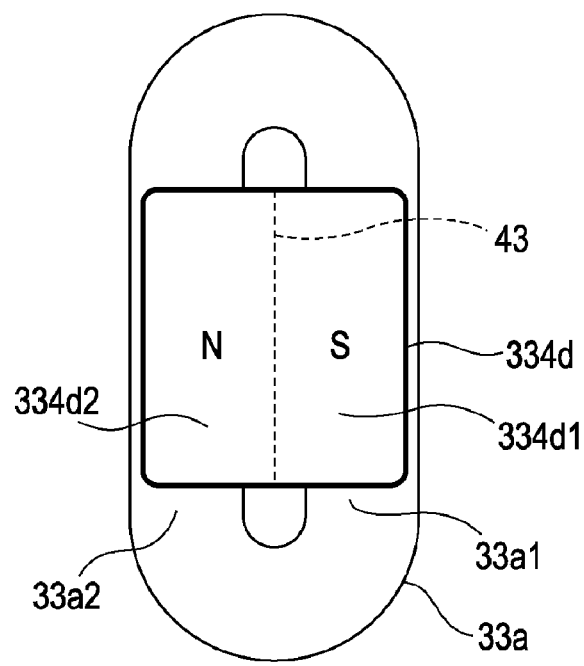
FIGS. 36A and 36B are a plan view and a side view of an actuator included in the lens driving device according to the fourth exemplary embodiment of the present invention, respectively.
Figure 36B:
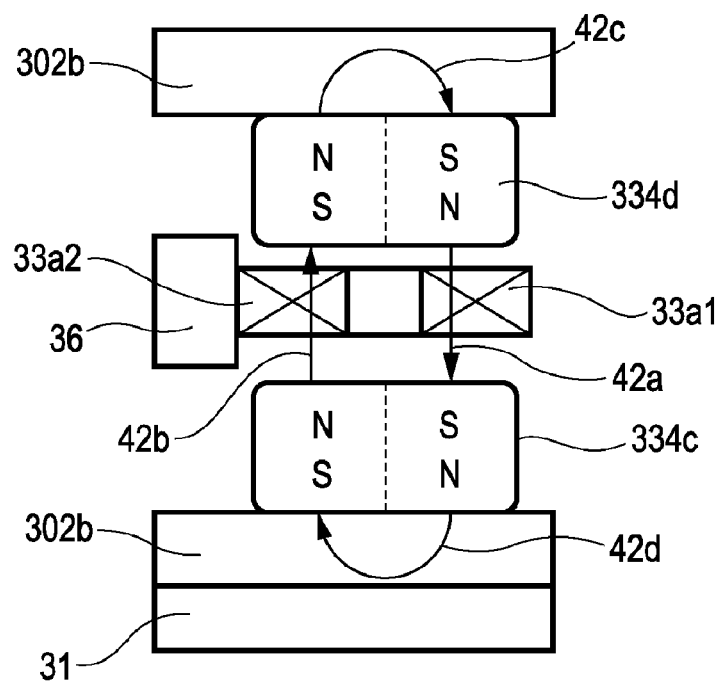

FIGS. 36A and 36B are schematic illustrations of the actuator. FIG. 36A is a diagram of only the magnets 334c and 334d and the coil 33a viewed in the light axis direction. FIG. 36B is a cross-sectional view of the magnets 334c and 334d cut at substantially the center thereof. In FIG. 36A, a magnetized boundary 43 between the N and S poles is shown. In FIG. 36B, magnetic field lines 42a, 42b, 42c, and 42d schematically represent typical magnetic lines generated in the vicinities of the magnets 334c and 334d and the coil 33a. As shown in FIG. 36A, the magnet 334d has two areas 334d1 and 334d2 with the magnetized boundary 43 therebetween. The magnet 334c has a similar configuration to that of the magnet 334d. The coil 33a has an oval shape when viewed in the light axis direction. For example, two long portions 33a1 and 33a2 of the coil 33a face the areas 334d1 and 334d2 of the magnet 334d, respectively.

As shown in FIG. 36B, the fixed yoke 302b is disposed on a surface of the magnet 334c opposite the coil 33a. It is desirable that the fixed yoke 302b is formed from a soft magnetic material. The fixed yoke 302b allows the majority of magnetic fluxes to pass therethrough so as to decrease the permeance of a magnetic circuit. Furthermore, the fixed yoke 302b is disposed on an opposite side of the magnet 334d from the coil 33a. The magnets 334c and 334d are disposed so as to attract each other. As a result, magnetic field lines 42a and 42b emanating from the magnet 334a to the coil 33a are linearly generated. According to the fourth exemplary embodiment, since the fixed yoke 302b is secured to the base plate 31, the weight of a moving part does not change even when the thickness of the fixed yoke 302b is increased. Therefore, the thicknesses of the fixed yoke 302b can be appropriately determined so that the magnetic fluxes in the fixed yoke 302b are not saturated while taking into account the saturation magnetic flux density, the shape of the magnet, and the surface magnetic flux density. In such a state, when the coil 33a is energized, electric currents flow in the long portions 33a1 and 33a2 in mutually opposite directions that are perpendicular to the plane of FIG. 36B. Accordingly, a driving force given by the Fleming's left-hand rule is generated. As illustrated in FIGS. 34A to 34C, since the movable lens barrel 36 is elastically supported. Thus, a relative movement between the base plate 31 and the movable lens barrel 36 is caused until the base plate 31 and the movable lens barrel 36 are moved to positions at which a resultant force of the elastic wires 301a, 301b, 301c, and 301d matches the above-described driving force. Since the resultant force of the elastic wires 301a, 301b, 301c, and 301d is proportional to an electric current for generating the driving force, the mechanism according to the fourth exemplary embodiment can be controlled using an open control method.

Figure 37A:
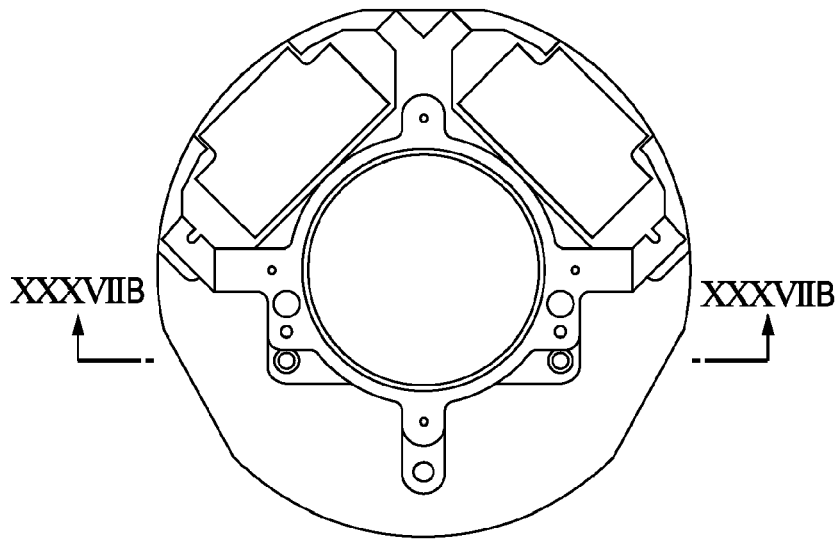
Figure 37B:
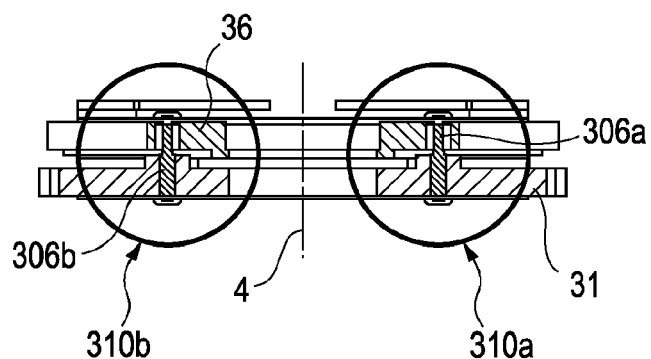
FIGS. 37B and 37C are cross-sectional views of the lens driving device shown in FIG. 37A.
Figure 37C:
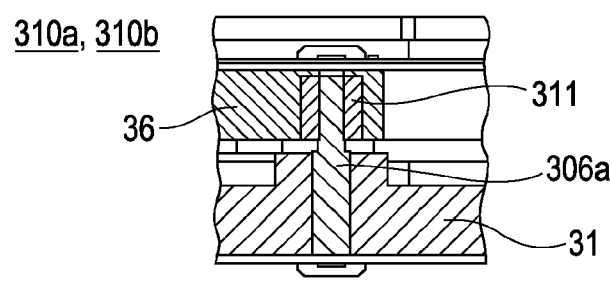

A method for mounting a damping unit is described next with reference to FIGS. 37A to 37C. FIG. 37A is a front view of the lens driving device 3 when viewed in the light axis direction. FIG. 37B is a cross-sectional view taken along line XXXVIIB-XXXVIIB of FIG. 37A. FIG. 37C is a detailed diagram of a damping unit mounting portion shown in FIG. 37B. In FIGS. 37B and 37C, the damping unit mounting portion 310a, a damping unit mounting portion 310b, and a damping unit 311 are shown.

As shown in FIG. 37B, the fixing pins 306a and 306b are screwed to the base plate 31. Thereafter, each of the fixing pins 306a and 306b extends towards a hole formed in the movable lens barrel 36 so as to at least partially overlap the movable lens barrel 36 in the light axis direction.

FIG. 37C is a detailed diagram of the damping unit mounting portion 310a. The damping unit mounting portion 310a is disposed so that the columnar fixing pin 306a secured to the base plate 31 is substantially coaxial with a cylindrical hole formed in the movable lens barrel 36. The damping unit 311 is toroidal and is disposed in a gap formed by the fixing pins 306a and the inner surface of the hole. The damping unit 311 can be suitably formed from the viscoelastic materials described in the first exemplary embodiment. By using the above-described damping unit 311, the same advantages as in the first exemplary embodiment can be provided. In addition, according to the fourth exemplary embodiment, in order to facilitate the assembly, the fixing pins 306a and 306b are employed. However, by changing the shape, the fixing pins 306a and 306b can be produced in the form of structural objects on the base plate 31.

Furthermore, according to the fourth exemplary embodiment, the damping unit 311 and the driving unit are disposed in substantially the same plane. That is, the center line of the damping unit 311 and the center line of the coils 33a and 33b (i.e., the center line of the driving force of the driving unit) are disposed in substantially the same plane that is perpendicular to the light axis. Such an arrangement can prevent unwanted yawing and pitching motions of the movable lens barrel 36 caused by a force being applied by the damping unit 311.

Figure 38:
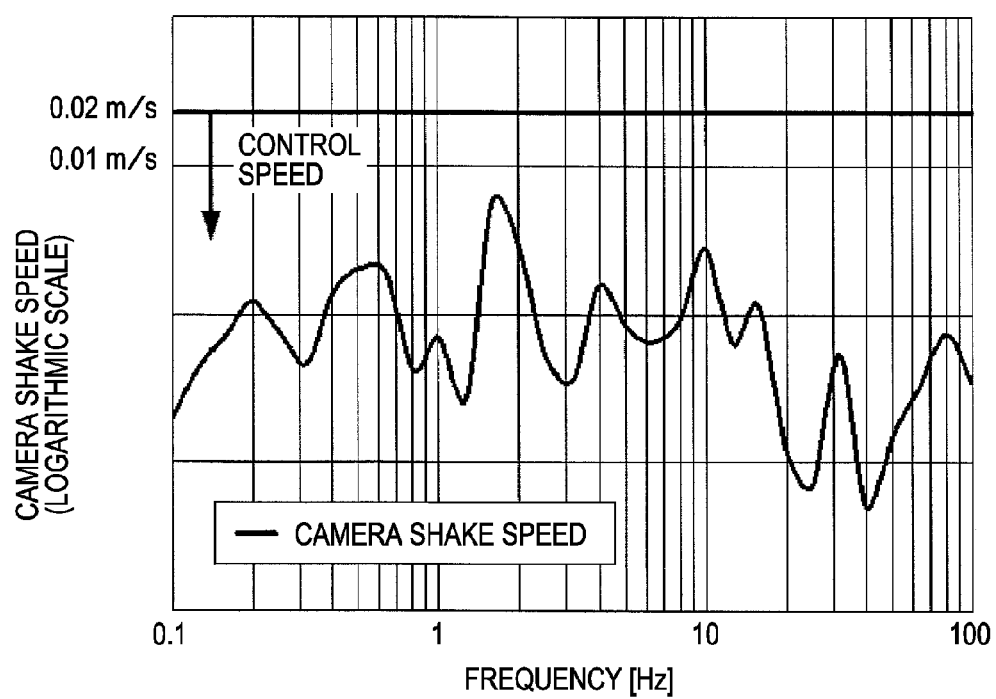
FIG. 38 illustrates a typical camera shake speed according to the fourth exemplary embodiment of the present invention.

FIG. 38 illustrates typical camera shake speeds in a frequency region. The ordinate represents speeds required for an image stabilization mechanism corresponding to the angular velocity of the vibration. The scale of the ordinate is logarithmic. Each scale mark denotes a value ten times larger than the preceding one. As can be seen from FIG. 17, the amplitude of the vibration decreases towards higher frequencies. Accordingly, as shown in FIG. 38, substantially the same speed caused by camera shake is input even when the frequency varies. When a user operates the image pickup apparatus to determine the composition of picture, an excessively high speed of camera shake is not input.

Therefore, according to the fourth exemplary embodiment, the mechanism limits the control speed to 0.02 m/s, as shown in FIG. 38. A moving coil actuator, as used in the fourth exemplary embodiment, has a slight advantage obtained by limiting the control speed. However, when, for example, a stepping motor is used as a driving source, a possibility of loss of synchronism can be advantageously reduced.

As noted above, according to the fourth exemplary embodiment, the lens driving device 3 can provide the following features:
1) Optimum damping
2) Prevention of unwanted yawing and pitching motions
3) Stable control performance even under feedback control.

The features of the above-described exemplary embodiments are summarized below.

1) The lens driving device 3 includes a fixed lens barrel, such as the base plate 31, for holding the objective taking lens 2 that forms an image of an object, the movable lens barrel 36 for movably holding the compensation lens 12 included in the objective taking lens 2 in a plane perpendicular to the light axis, one of an actuator for moving the movable lens barrel 36 relative to the fixed lens barrel in a frequency region less than or equal to 100 Hz (refer to the first to third exemplary embodiments) and an actuator for moving the movable lens barrel 36 relative to the fixed lens barrel at a speed less than or equal to 0.02 m/s (refer to the fourth exemplary embodiment), and one of the damping units 45, 104, 219, and 311 disposed between the movable lens barrel 36 and the fixed lens barrel.

Such a structure can provide the lens driving device 3 with a simplified structure, a small friction, an appropriate viscous resistance, and a frequency characteristic suitable for image stabilization for preventing camera-shake blur.

2) The lens driving device 3 further includes a plurality of balls 32a to 32c sandwiched by the movable lens barrel 36 and the fixed lens barrel and the elastic members 35a, 35b, and 35c for urging the movable lens barrel 36 towards the fixed lens barrel. In place of the elastic members 35a, 35b, and 35c, or in addition to the elastic members 35a, 35b, and 35c, the lens driving device 3 may include a plurality of elastic wires 301 that extend parallel to the light axis of the objective taking lens 2 and that are secured to the movable lens barrel 36 and the fixed lens barrel.

Such a structure can provide the lens driving device 3 with a further small friction, thus responding to even a small vibration.

3) In the lens driving device 3, the damping unit and the actuator are disposed in substantially the same plane that is substantially perpendicular to the light axis. In addition, a plurality of damping units are disposed at line-symmetric locations or point-symmetric locations. Furthermore, the damping unit has a substantially circular shape when being projected onto a plane perpendicular to the light axis. Furthermore, the damping unit is disposed in a gap between the inner surface of a cylindrical hole formed in the movable lens barrel 36 and a columnar shaft or between the inner surface of a cylindrical hole formed in the fixed lens barrel and a columnar shaft. Note that the cylindrical hole formed in the movable lens barrel 36 is not a through-hole.

Such a structure allows the lens driving device 3 to be insensitive to the effect of a spurious resonance.

4) As shown in FIGS. 6A to 6C, let a denote a distance between a contact surface of the movable lens barrel 36 and a contact surface of the fixed lens barrel for preventing the overrun of the movable lens barrel 36. Let b denote a distance between the movable lens barrel 36 located at a position at which the damping unit is provided and the fixed lens barrel. Then, the condition a<b is satisfied. More specifically, when a denotes a distance between a contact surface of the movable lens barrel 36 and a contact surface of the fixed lens barrel for preventing the overrun of the movable lens barrel 36, and b denotes a distance between the movable lens barrel 36 located at a position at which the damping unit is provided and the fixed lens barrel, the condition a<0.5b is satisfied. Alternatively, let b denote a distance between the movable lens barrel 36 located at a position at which the damping unit is provided and the fixed lens barrel. Let c denote an amount of movement of the movable lens barrel in the control state. Then, the condition b>c is satisfied. More specifically, when b denotes a distance between the movable lens barrel 36 located at a position at which the damping unit is provided and the fixed lens barrel and c denotes an amount of movement of the movable lens barrel in the control state, the condition 0.5b>c is satisfied.

Such a structure allows the lens driving device 3 to prevent an occurrence of plastic deformation of the damping unit that provides a viscous resistance.

5) In the lens driving device 3, part of or all of the damping unit is in contact with the movable lens barrel 36 or the fixed lens barrel via an ultraviolet light-transparent member. Such a structure allows the lens driving device 3 to be assembled with improve productivity.

6) In the lens driving device 3, the damping unit is formed from a gel that consists primarily of silicon, an elastomer, or a butyl rubber. Such a structure allows the lens driving device 3 to have a damping unit formed from an optimum material.

7) In the lens driving device 3, the actuator is controlled by an open control method. Such a structure allows the lens driving device 3 to have a frequency characteristic suitable for image stabilization using a simplified structure.

As described above, by including the lens driving device 3 having any one of the above-described structures, an image stabilizing unit and the image pickup apparatus 1 having an excellent image stabilization performance and an excellent disturbance-proof performance can be achieved.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. A lens driving device comprising:
   a holding member configured to hold a compensation lens for image stabilization;
   a stationary member configured to support the holding member in a movable manner substantially perpendicular to a light axis;
   a driving unit configured to change the position of the holding member relative to the stationary member; and
   a damping material disposed between the holding member and the stationary member,
   wherein an axis member parallel to the light axis is provided to either of the holding member or the stationary member, a hole parallel to the light axis is provided to the holding member or the other stationary member, the axis member is inserted into the hole, and the damping material is disposed between the axis member and the hole.

2. The lens driving device according to claim 1, wherein the damping material is an ultraviolet-curable silicone gel and the gel material has a transition region in the frequency range when the ultraviolet-curable silicone gel is cured.

3. The image stabilizing unit according to claim 1, wherein the damping material is arranged in line symmetry or point symmetry when projected from the direction parallel to the light axis.

4. The image stabilizing unit according to claim 1, wherein a shape of the hole is either round shape or oval figure when projected from the direction parallel to the light axis.

5. The image stabilizing unit according to claim 1, wherein the stationary member is having a regulation unit configured to regulate a motion of the holding member, and when defining movable range quantity between the hole and the axis member inserted to the hole as "b" and movable range quantity between the holding member and the regulation unit of the stationary member as "a", condition a<b is fulfilled.

6. The image stabilizing unit according to claim 1, further comprising:
   a transparent member for transferring ultraviolet light beam, wherein the transparent member contacts the damping material and also contacts the stationary member or the holding member.

7. The image stabilizing unit according to claim 1, wherein the damping material and the driving unit are arranged in a same plane that is perpendicular to a light axis.

8. An image stabilizing unit which includes the lens driving device shown in claim 1.

9. An image pickup apparatus having the image stabilization unit shown in claim 8.

10. An image stabilizing unit comprising:
    a holding member configured to hold a compensation lens for image stabilization;
    a stationary member configured to support the holding member in a movable manner substantially perpendicular to a light axis;
    a driving unit configured to change the position of the holding member relative to the stationary member;
    a plurality of balls sandwiched between the holding member and the driving unit; and
    a biasing member configured to bias the plurality of balls to be sandwiched between the holding member and the driving unit, one end of the biasing member is locked to the holding member and the other end of the driving unit is locked to the stationary member, and
    a damping material disposed between the holding member and the stationary member,
    wherein an axis member parallel to the light axis is provided to either of the holding member or the stationary member, a hole parallel to the light axis is provided to the holding member or the other stationary member, the axis member is inserted into the hole, and the damping material is disposed between the axis member and the hole.

11. The lens driving device according to claim 10, wherein the damping material is an ultraviolet-curable silicone gel and the gel material has a transition region in the frequency range when the ultraviolet-curable silicone gel is cured.

12. The image stabilizing unit according to claim 10, wherein the damping material is arranged in line symmetry or point symmetry when projected from the direction parallel to the light axis.

13. The image stabilizing unit according to claim 10, wherein a shape of the hole is either round shape or oval figure when projected from the direction parallel to the light axis.

14. The image stabilizing unit according to claim 10, wherein the stationary member is having a regulation unit configured to regulate a motion of the holding member, and when defining movable range quantity between the hole and the axis member inserted to the hole as "b" and movable range quantity between the holding member and the regulation unit of the stationary member as "a", condition a<b is fulfilled.

15. The image stabilizing unit according to claim 10, further comprising:
    a transparent member for transferring ultraviolet light beam, wherein the transparent member contacts the damping material and also contacts the stationary member or the holding member.

16. The image stabilizing unit according to claim 10, wherein the damping material and the driving unit are arranged in a same plane that is perpendicular to a light axis.

17. An image pickup apparatus which includes the image stabilizing unit shown in claim 10.

* * * * *